(12) United States Patent
Oesterreicher et al.

(10) Patent No.: US 7,500,055 B1
(45) Date of Patent: Mar. 3, 2009

(54) ADAPTABLE CACHE FOR DYNAMIC DIGITAL MEDIA

(75) Inventors: Richard T. Oesterreicher, Naples, FL (US); Craig Murphy, Kirkland, WA (US); Brian Eng, Bellevue, WA (US); Brad Jackson, Kirkland, WA (US)

(73) Assignee: Beach Unlimited LLC, Las Vegas, NV (US)

(*) Notice: Subject to any disclaimer, the term of this patent is extended or adjusted under 35 U.S.C. 154(b) by 222 days.

(21) Appl. No.: 10/609,433

(22) Filed: Jun. 27, 2003

(51) Int. Cl.
*G06F 12/00* (2006.01)
(52) U.S. Cl. .................................................... 711/118
(58) Field of Classification Search .................. 711/118
See application file for complete search history.

(56) References Cited

U.S. PATENT DOCUMENTS

| | | | | |
|---|---|---|---|---|
| 5,353,430 A * | 10/1994 | Lautzenheiser | ............. | 711/117 |
| 5,561,823 A * | 10/1996 | Anderson | .................... | 710/52 |
| 5,586,291 A * | 12/1996 | Lasker et al. | ................ | 711/113 |
| 5,761,458 A * | 6/1998 | Young et al. | ................ | 710/311 |
| 6,148,368 A * | 11/2000 | DeKoning | .................. | 711/113 |
| 6,189,080 B1 * | 2/2001 | Ofer | ........................... | 711/167 |
| 6,327,614 B1 * | 12/2001 | Asano et al. | ................ | 709/213 |
| 6,535,518 B1 * | 3/2003 | Hu et al. | ..................... | 370/401 |
| 6,587,921 B2 * | 7/2003 | Chiu et al. | ................... | 711/119 |
| 6,665,704 B1 * | 12/2003 | Singh | ......................... | 709/203 |
| 6,728,850 B2 * | 4/2004 | Gotoh et al. | ................ | 711/167 |
| 6,986,018 B2 * | 1/2006 | O'Rourke et al. | ........... | 711/213 |
| 7,043,558 B2 * | 5/2006 | Yoshida et al. | .............. | 709/231 |
| 2002/0169827 A1 * | 11/2002 | Ulrich et al. | ................ | 709/203 |
| 2003/0055910 A1 * | 3/2003 | Amini et al. | ................ | 709/214 |
| 2004/0024941 A1 * | 2/2004 | Olarig et al. | ................ | 710/302 |
| 2004/0093288 A1 * | 5/2004 | Strothmann et al. | .......... | 705/29 |

* cited by examiner

*Primary Examiner*—Matthew Kim
*Assistant Examiner*—Sheng-Jen Tsai
(74) *Attorney, Agent, or Firm*—Woodcock Washburn LLP

(57) ABSTRACT

A system and method are disclosed for eliminating many of the transactional performance limitations in current digital media server systems by augmenting those existing systems with an adaptable cache. In a preferred embodiment, the adaptable cache is a compact storage device that can persist data and deliver it at an accelerated rate, as well as act as an intelligent controller and director of that data. Incorporating such an adaptable cache between existing storage devices and an external network interface of a media server, or at the network interface itself, significantly overcomes the transactional limitations of the storage devices, increasing performance and throughput for the overall digital media system. The adaptable cache of the present system and method may preferably be integrated directly into the storage and delivery pipelines, utilizing the native communications busses and protocols of those subsystems.

29 Claims, 17 Drawing Sheets

MEDIA SERVER 700

Typical media server

Figure 2 Prior Art: Typical Digital Media Server

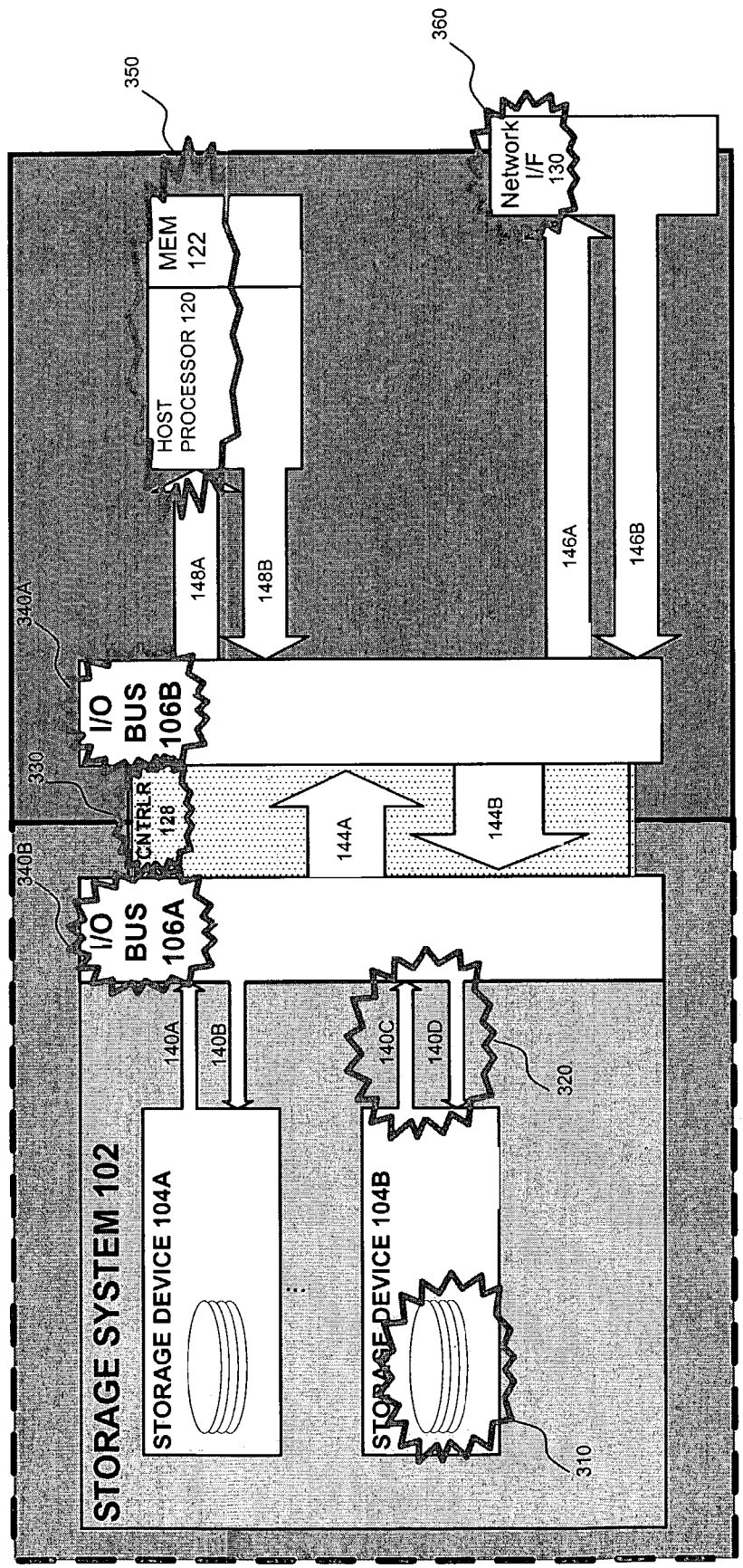
Figure 3 Potential Bottlenecks In a Typical Media Server

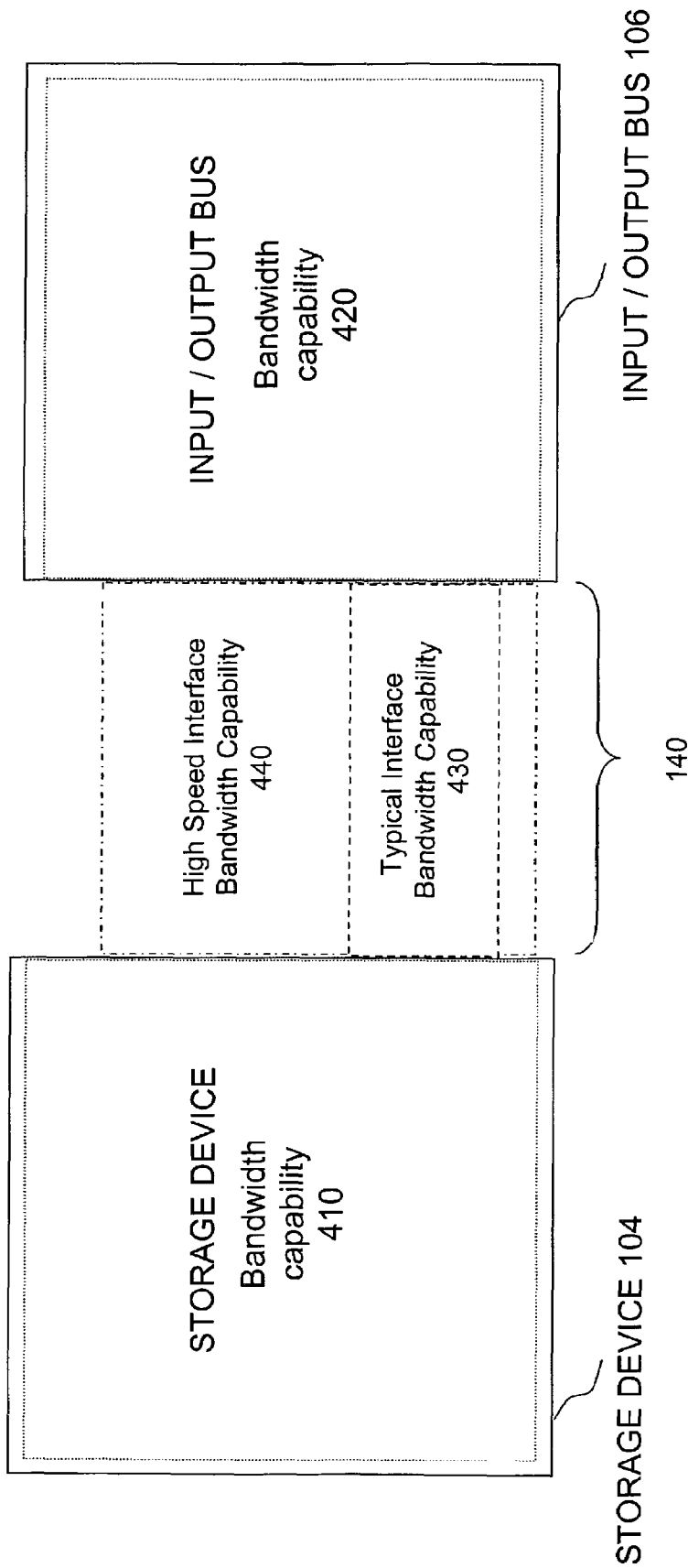
Figure 4 INPUT/OUTPUT BUS THROTTLE

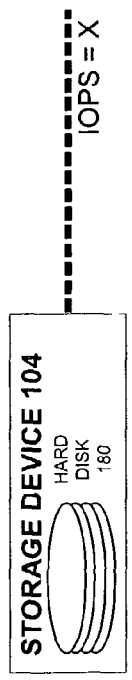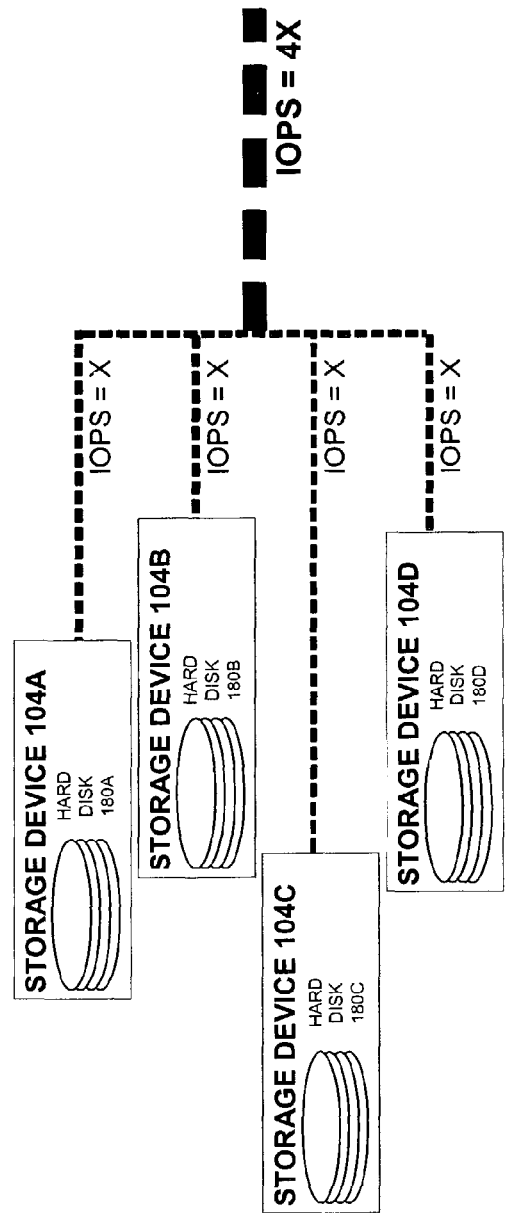
Figure 5A – Typical Input / Output Operations per Second
Figure 5B – RAID Input / Output Operations per Second

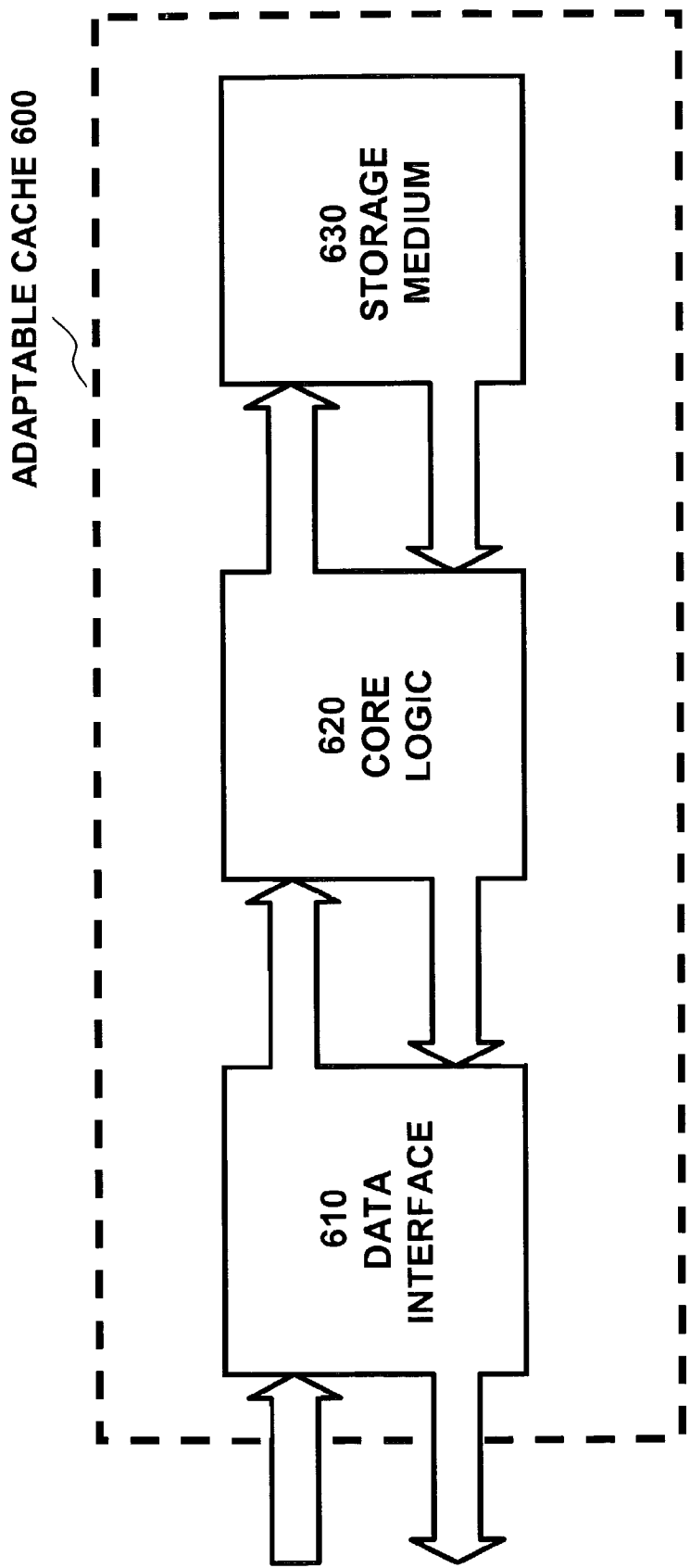
Figure 6A – Conceptual components of Invention

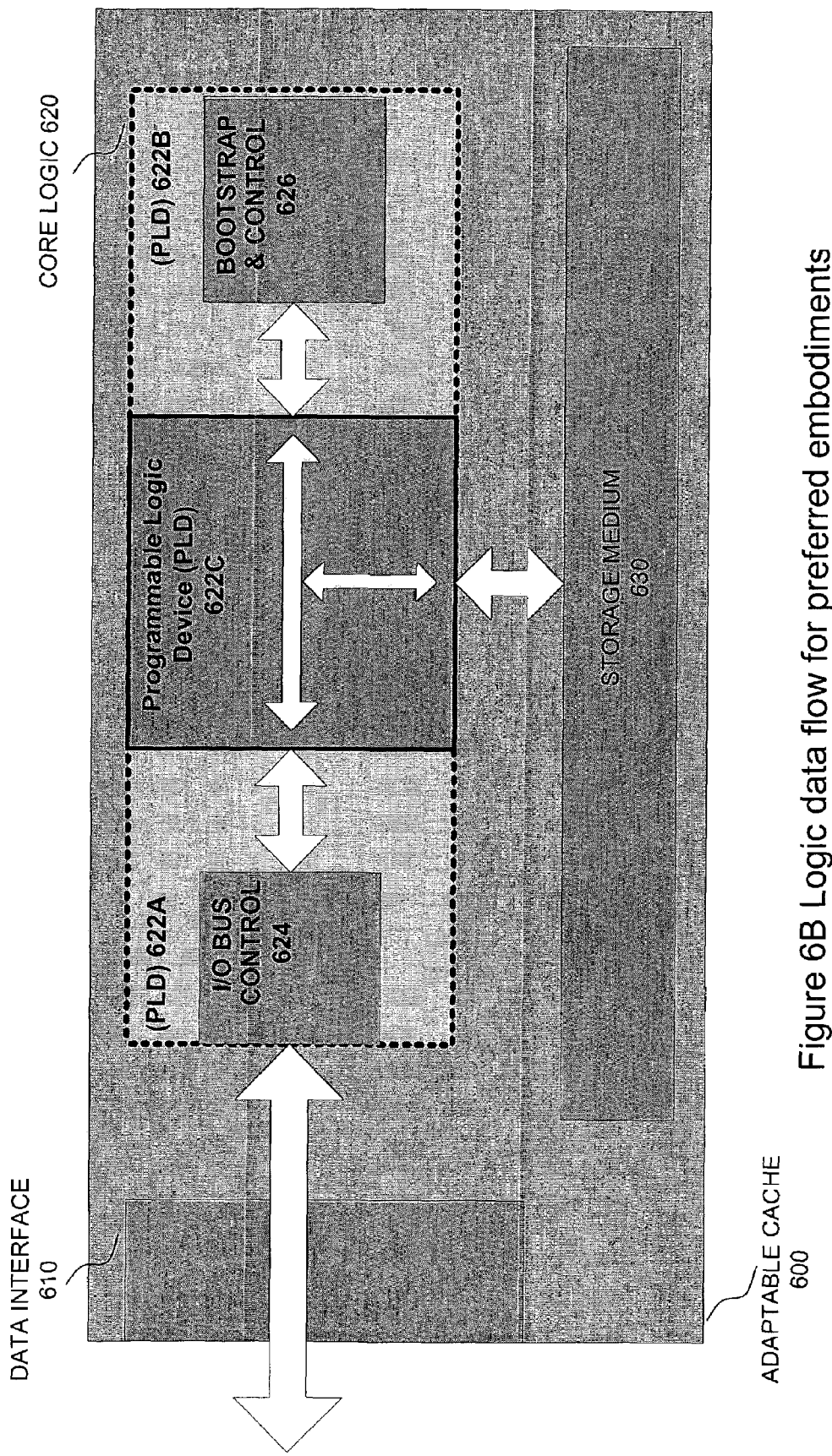
Figure 6B Logic data flow for preferred embodiments ived at
ADAPTABLE CACHE FOR DYNAMIC DIGITAL MEDIA

FIELD OF THE INVENTION

This invention relates to the field of digital media servers.

BACKGROUND OF THE INVENTION

Digital media services are growing in importance and gaining acceptance as the underlying technologies for providing these services mature. But, one limitation on implementing such services is the transactional performance or data-access speed of storage devices. As the demand for digital media increases, limits on transactional performance become more evident and impede system performance and growth.

One known technology for improving data-access performance is a cache. A cache is high-speed memory accessible by a disk, controller, or host, whose primary purpose is to reduce the effective time required to read data from or write data to a lower speed storage device. A cache may reside within a storage device, host processor, or controller or may be located external to any of these devices.

Caches improve performance in hard disk based systems by reducing the requirement for mechanical movement in the storage device, thus minimizing or eliminating bottlenecks related to hard disk access speed. Such caches typically utilize random access memory (RAM) to speed up data access by temporarily storing frequently or most-recently used data in the cache. Although RAM access is much faster than hard disk access, cache effectiveness is often hindered by latencies associated with multiple bus traversals and the fixed amount of RAM that may be integrated into the cache. Furthermore, hard disk drive cache sizes are usually limited to 8 MB or less. These caches lack the physical size to store requested resources in the media server context, where a typical resource is in excess of 100 MB.

Caches implemented on other devices, such as a processor or host bus adapter, typically utilize a small amount (512 KB or less) of high speed memory for caching frequently used instructions or data. These caches are typically too small to increase system performance where large amounts of data are being transferred between devices or system buses. Furthermore, system performance is typically still limited, since points of system degradation ("bottlenecks") may still occur at connections between devices and I/O buses or at connections between the cache and the device accessing the cache.

FIG. 1 illustrates a typical media server arrangement in the prior art. As shown in FIG. 1, media server 100 typically comprises a host processor 120 which is a computing device having a central processing unit adapted to access and process instructions stored in a memory 122. Host processor 120 preferably runs an application adapted to receive digital media requests from clients, administrators, and other applications (e.g., an application running on a second media server in the same server cluster as media server 100), and to respond to such requests by retrieving the requested digital media, converting it to wire format, and transmitting it to a client or other location via a suitable network or other communication link.

Media server 100 further comprises a network interface 130 for receiving digital-media assets asset requests (e.g., for a movie, video clip, etc.) and forwarding the requests to host processor 120 via a connection 146B. Network interface 130 may, for example, be a network interface card (NIC). Connection 146B connects to I/O bus 106B which transmits the request to host processor 120 via connection 148A. Host processor 120 processes received requests and retrieves requested assets from a storage system 102 via host bus 106B and a secondary (storage system) I/O bus 106A, as described below.

Also shown in FIG. 1 is a storage system 102 comprising a plurality of interconnected physical or logical storage devices 104. Each storage device 104 may contain one or more hard disk drives 180.

Further shown in FIG. 1 is a controller 128 preferably adapted to facilitate communication between host I/O bus 106B and storage system I/O bus 106A. Host I/O bus 106B preferably is connected to network interface 130 via bi-directional connection 146, and to host processor 120 via bi-directional connections 148. Similarly, storage system I/O bus 106A preferably is connected to storage devices 104 via bi-directional connections 140.

FIGS. 2A-2D are composite block/flow diagrams illustrating processing of a typical asset request in the prior art. As shown in FIG. 2A, a user request preferably is received at network interface 13Q and forwarded to host processor 120 via connection 146B, I/O bus 106B, and connection 148A. In FIG. 2B, host processor 120 processes the request and sends instructions to retrieve the requested asset through host side I/O bus 106B, controller 128 (e.g., a host bus adapter), and storage system I/O bus 106A to the storage device 104 that contains the asset. In some systems, storage system 102 may reside on the same I/O bus as host processor 120.

In FIG. 2C, storage device 104 retrieves the requested asset and delivers it to host processor 120. Host processor 120 prepares the asset and transmits it to network interface 130 for delivery to the requesting user as shown in FIG. 2D.

FIG. 3 is a block diagram illustrating potential bottlenecks in media server 100. As shown in FIG. 3, bottlenecks may be device related or may occur at connections between devices and I/O buses, at connections between two or more I/O buses (e.g., at controller 128), or as a result of the physical limitations of the I/O bus itself. These bottlenecks decrease speed and efficiency of the overall system by requiring components to operate at less than their optimal individual speeds.

More specifically, asset requests received at network interface 130 may overburden the interface and result in bottleneck 360. Further, the media server may encounter system performance degradation resulting in bottleneck 350 if host processor 120 cannot process requests efficiently. Additionally, if storage device 104 cannot retrieve the requested asset immediately, or if storage device 104 is limited by its physical characteristics, bottleneck 310 may result.

In addition to these device-related bottlenecks, connection-related bottlenecks may also occur. For example, where the connection between storage device 104 and the storage system I/O bus has a lower bandwidth capability than the storage device or the I/O bus, bottleneck 320 may occur. As described below, this results in storage device 104 restricting its data flow to I/O bus 106 due to the bandwidth capability of connection 140 and not utilizing its full capability for transmitting information to storage system I/O bus 106A. Further, where controller 128 cannot route data efficiently from one I/O bus to another, or where controller 128 becomes overburdened due to bus traversal traffic, bottleneck 330 may occur. Additionally, when the I/O bus itself cannot handle the amount of data passed to-it from a device, bottleneck 340 may occur. As will be recognized, bottlenecks may also occur at any inter-connection between devices where data flow exceeds the connection bandwidth, e.g., where data transmissions from I/O bus 106A to storage device 104 exceed the maximum bandwidth capability of the connection interface.

FIG. 4 illustrates potential bottleneck 320 in greater detail. As shown in FIG. 4, storage device 104 may have a bandwidth capability 410 comparable to the bandwidth capability 420 of I/O bus 106. By contrast, connection 140 may be a typical interface connection with a bandwidth capability 430 of less than 50 MBps, such as IDE (ATA), or E-IDE (fast ATA). Thus, while the storage device may be capable of delivering enough data to saturate the I/O bus, interface connection 140 nevertheless restricts the flow of data. As will be recognized, this bottleneck may be alleviated to some degree by using an alternative interface such as an optical interface (fibre channel arbitrated loop ("FC-AL")), small computer system interface ("SCSI"), or serial ATA ("S-ATA") connection, but some degree of bottleneck may nevertheless remain.

FIGS. 5A-5B are a block diagram illustrating the number of input and output operations per second (IQPS) a storage device typically performs. The higher the number of IOPS a device can perform, the better the resulting performance of the particular device and, in general, the entire system. While hard disk drives have been increasing in speed and capacity, inherent physical limitations associated with retrieving data from the rotating platters still exist.

One aspect of these physical limitations is measurable as seek times, i.e., the amount of time it takes for the drive to access the beginning of a block of data to be transferred from the disk, given the starting and target locations. Seek times on the highest performing disk drives today average in the 3-5 millisecond (ms) range for randomly located data. Assuming a seek time of 5 ms (and without taking into consideration the time needed to read from the drive) the drive would theoretically be limited to between 200 IQPS. A faster seek time of 3 ms would result in a maximum IOPS of 333.

In addition to seek time, however, another important aspect that reduces IOPS is transfer time. Most high performance drives can sustain transfers of approximately 25 MB per second. This number is an average since blocks on the inner portion of the platter can be accessed faster than blocks on the outer portion of the platter. For example, if a media server needs to transfer one second of content for a movie encoded at 3.75 Mbps, approximately 3.75 Mb (or 0.469 MB) of data would be transferred. This represents approximately ⅕₀th of a second or approximately 20 ms. Coupled with the initial seek time (3-5 ms) from above, typical time requirements are thus approximately 23-25 ms. Using this approximation, a typical media server with only one drive can perform between 40-43 IOPS.

A primary method of increasing IOPS performance, often incorporated into high-performance media servers and storage systems, is to utilize a plurality of directly connected hard disk drives. This can improve performance by performing transactions in parallel on different drives. It also can improve performance by decreasing the transfer time. Generally, high-performance hard disk drives are used for increased system performance. A high-performance hard disk drive typically has a maximum mechanical spindle rotation speed of 15,000 revolutions per minute (RPM). In a digital media server or stand-alone storage system, these hard disk drives are either configured as just a bunch of disks (JBOD) or, more typically, as a redundant array of independent disks (RAID). Using one of these configurations increases the virtual size of the storage system, allowing a larger amount of data to flow from the virtual disk. For example, four hard disk drives spinning at 15,000 RPM can be represented as a single virtual disk, which theoretically achieves a maximum rotational speed of 60,000 RPM.

As shown in FIGS. 5A-B, if a single 15,000 RPM hard disk drive may achieve IOPS performance of X, then four identical drives in a virtual set can theoretically achieve IOPS performance of 4×. For example, if the one drive delivers 40-43 TOPS, then the 4 drives can theoretically achieve 160-172 IOPS. As will be recognized, however, there are many real-world factors, such as data placement on the drive platters, file fragmentation, and head placement at the time of the request, that make this theoretical limit virtually impossible to achieve outside the most ideal controlled conditions.

Thus, digital media systems based solely hard disk drives suffer from limitations on transactional throughput which manifest themselves in the form of relatively low IOPS and a reduced ability to deliver high numbers of digital media files to an ever increasing consumer base.

SUMMARY OF THE INVENTION

A system and method are disclosed for eliminating many of the transactional performance limitations in current digital media server systems by augmenting those existing systems with an adaptable cache. In a preferred embodiment, the adaptable cache is a compact storage device that can persist data and deliver it at an accelerated rate, as well as act as an intelligent controller and director of that data. Incorporating such an adaptable cache between existing storage devices and an external network interface of a media server, or at the network interface itself, significantly overcomes the transactional limitations of the storage devices, increasing performance and throughput for the overall digital media system.

The adaptable cache of the present system and method may preferably be integrated directly into the storage and delivery pipelines, utilizing the native communications busses and protocols of those subsystems. Further, the invention can dynamically incorporate algorithms for maximization of storage retrieval and delivery performance.

The present adaptable cache decreases the number of storage devices required by a digital media system to achieve a desired output capacity, thus reducing the physical and administrative scale of the resulting system. This serves to increase the efficiency of all digital media servers in a system, reduce the total cost of system ownership, and make the system available to a larger number of consumers. Moreover, with the present system and method, system operators need not replicate digital media across large numbers of digital media servers or storage systems to overcome the transactional performance of inferior systems. This efficiency gain allows digital media system owners and operators to implement full-scale digital media services deployments as they become more cost effective to meet anticipated or actual user demand for those services.

In one aspect, the present invention is directed to a method for reducing bus traversal in a media server comprising a host processor, a network interface, and a storage subsystem comprising one or more storage devices, the host processor and network interface being connected to a first input-output bus, the storage subsystem being connected to a second input-output bus, the first and second input-output buses being connected via a controller, the method comprising:

providing an adaptable cache connected to the first input-output bus, said adaptable cache comprising a data interface, core logic, and electronic storage media; receiving a request for a media asset via a network, said request being received by the network interface;

receiving the request at the adaptable cache;

processing the request by the adaptable cache, wherein if the requested media asset is found on the electronic storage media, the media asset is returned to the user via the first bus and not the second bus, and wherein if the requested media asset is not found on the electronic storage media, the media asset is accessed from the storage subsystem and returned to the user via the second bus and first bus.

In another aspect of the present invention, the method further comprises the request being received at the adaptable cache via the host processor.

In another aspect of the present invention, the method further comprises the request being received at the adaptable cache directly from the network interface.

In another aspect of the present invention, the method further comprises the adaptable cache being integrated with the network interface.

In another aspect of the present invention, the method further comprises the adaptable cache being integrated in the controller.

In another aspect of the present invention, the method further comprises the adaptable cache monitoring requests for media assets and if it is determined that the media asset should be cached, the media asset is transferred from one or more storage devices to the electronic storage media.

In another aspect of the present invention, the method further comprises the adaptable cache monitoring requests for media assets and if it is determined that the media should be cached, the adaptable cache notifies requesting applications that it can accept future requests for said media assets.

In another aspect of the present invention, the method further comprises the adaptable cache monitoring requests for media assets and if it is determined that the media should be cached, the adaptable cache notifies the storage subsystem to disregard requests to deliver the media.

In another aspect of the present invention, the method further comprises wherein the requested media asset is not found on the electronic storage media, the adaptable cache stores the requested media asset on the electronic storage media.

In another aspect of the present invention, the method further comprises the adaptable cache integrating into the media server via an expansion card slot.

In another aspect of the present invention, the method further comprises the adaptable cache integrating with native communications busses and protocols existing on the media server.

In another aspect of the present invention, the method further comprises the adaptable cache utilizing the busses and protocols existing on the media server.

In another aspect, the present invention is directed to a method for improving transactional performance in a media server comprising a host processor, a network interface, and a storage subsystem comprising one or more storage devices, the host processor and network interface being connected to a first input-output bus, the storage subsystem being connected to a second input-output bus, the first and second input-output buses being connected via a controller, the method comprising:

provided an adaptable cache connected to the second input-output bus, said adaptable cache comprising a data interface, a core logic, and electronic storage media, and enabled to:
  dynamically accept algorithms and heuristics that define or alter its operating characteristics without disrupting the operation of the media server,
  determine whether to retrieve and store data from the storage subsystem based on the algorithms and heuristics;
  retrieve data from the storage subsystem using its own data interface;
receiving a request for a media asset via a network, said request being received by the network interface;
receiving the request at the adaptable cache;
processing the request by the adaptable cache, wherein if the requested media asset is found on the electronic storage media, the media asset is returned to the user without accessing the one or more storage devices on the storage subsystem, and wherein if the requested media asset is not found on the electronic storage media, the media asset is accessed from one or more storage devices on the storage subsystem and returned to the user.

In another aspect of the present invention, the method further comprises the request being received at the adaptable cache via the second input-output bus.

In another aspect of the present invention, the method further comprises the adaptable cache integrating into the media server via an expansion card slot.

In another aspect of the present invention, the method further comprises the requested media asset not being found on the electronic storage media, and the adaptable cache then storing the requested media asset on the electronic storage media.

In another aspect of the present invention, the method further comprises the adaptable cache monitoring requests for media assets and if it is determined that the media asset should be cached, the media asset is transferred from one or more storage devices to the electronic storage media.

In another aspect of the present invention, the method further comprises the adaptable cache monitoring requests for media assets and if it determines that the media should be cached, the adaptable cache accepts future requests for said media assets.

In another aspect of the present invention, the method further comprises the adaptable cache monitoring requests for media assets and if it is determined that the media should be cached, the adaptable cache notifies the storage subsystem to disregard requests to deliver the media.

In another aspect of the present invention, the method further comprises wherein the adaptable cache integrates with native communications busses and protocols existing on the media server.

In another aspect of the present invention, the method further comprises the adaptable cache utilizing the busses and protocols existing on the media server.

In another aspect, the present invention is directed to a system for facilitating delivery of media resources, comprising:

a media server comprising a host processor, a network interface, and a storage subsystem comprising electronic storage media, the host processor and network interface being connected to a first input-output bus, the storage subsystem being connected to a second input-output bus, the first and second input-output buses being connected via a controller, an adaptable cache connected to an input-output bus comprising a data interface, core logic, and electronic storage media, the adaptable cache being adapted to store data on the electronic storage media, and further being adapted to receive and process requests for media assets, wherein if the requested media asset is found on the electronic storage media, the media asset is returned to a requestor via one or more I/O buses, and wherein if the requested media asset is not found on the electronic storage media, the media asset is accessed from the storage subsystem and returned to the requestor.

In a preferred embodiment, the adaptable cache comprises core logic that includes instructions for when and how to cache content. This embeds decision making and control functionality directly into core logic, allowing the adaptable cache to become a hybrid storage device/HBA. The core logic is also preferably programmed with dynamic algorithms and heuristics that define or alter the adaptable cache's operating characteristics.

BRIEF DESCRIPTION OF THE DRAWINGS

FIG. 3 is a block/flow diagram illustrating potential bottlenecks in a typical media server of the prior art;

FIG. 4 is a block diagram illustrating one bottleneck of FIG. 3 in greater detail;

FIGS. 5A-5B are block diagrams illustrating typical storage device performance in the prior art;

FIG. 6A is a block diagram illustrating a preferred embodiment of an adaptable cache of the present invention;

FIG. 6B is a block diagram illustrating components of the adaptable cache of FIG. 6A in more detail;

DETAILED DESCRIPTION OF THE DRAWINGS

Figure 1:
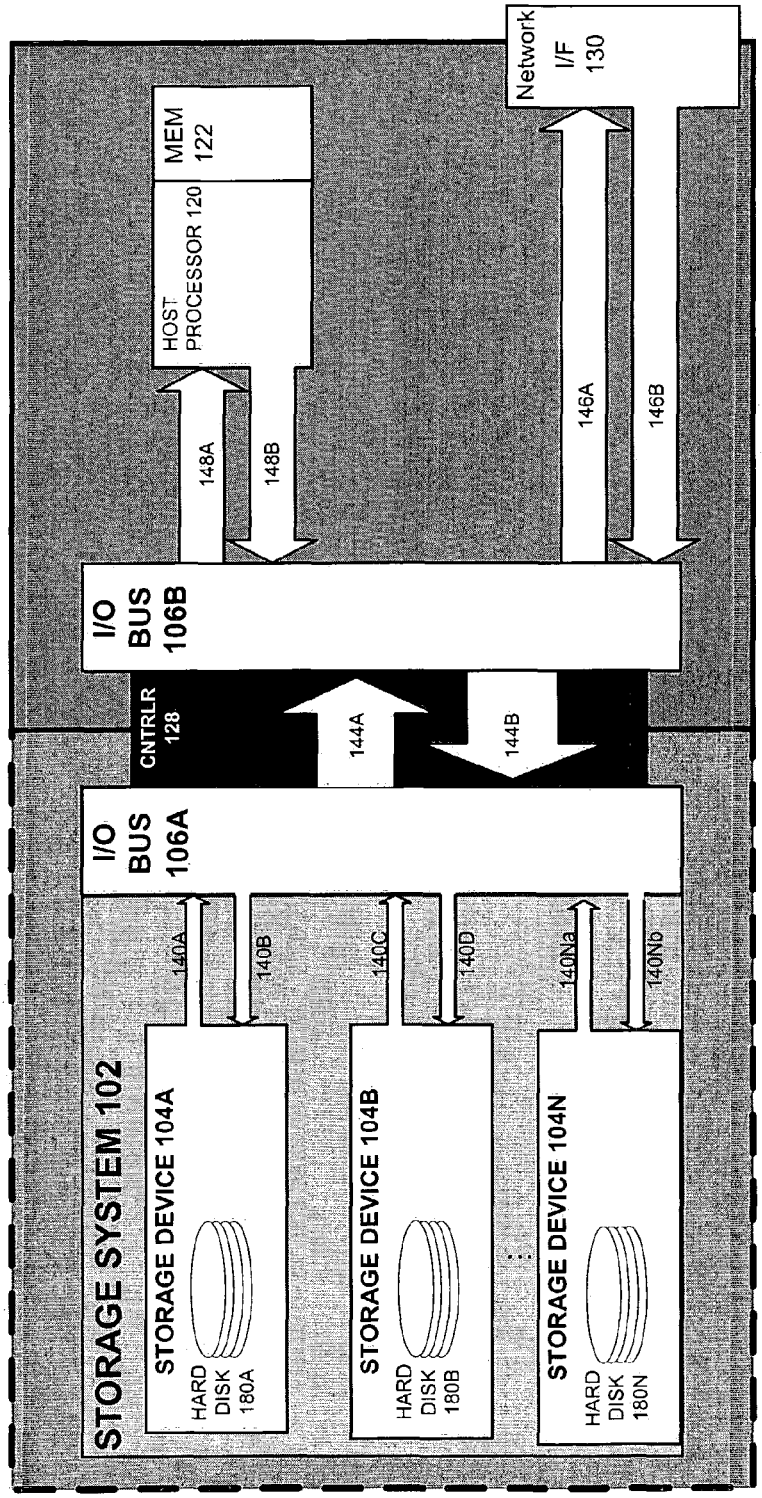
FIG. 1 is a composite block/flow diagram illustrating a typical media server of the prior art.
Figure 2A:
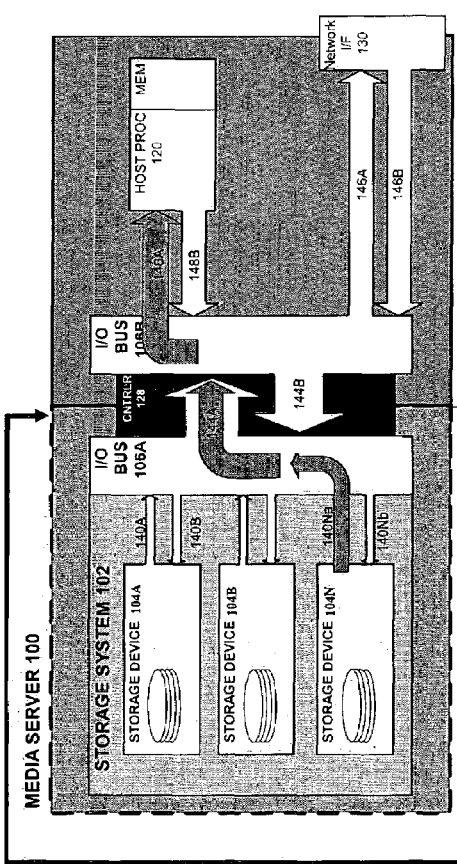
FIGS. 2A-2D are block/flow diagrams illustrating data flow in a typical media server as known in the art.
Figure 2C:
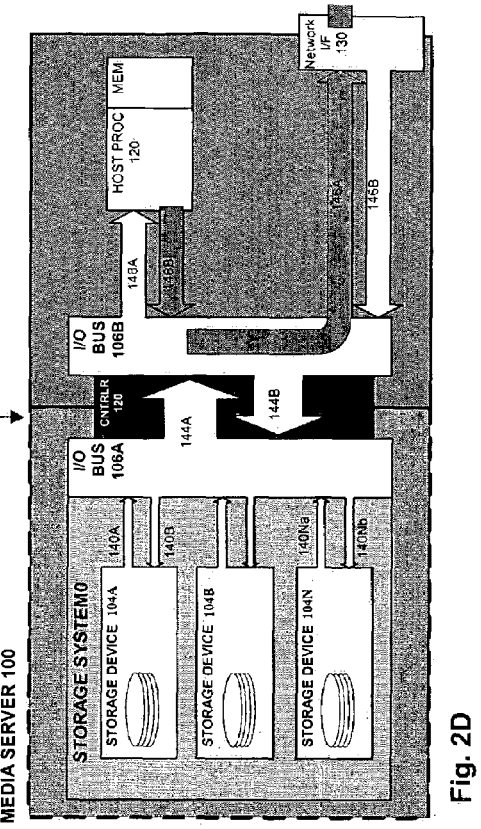
Figure 2B:
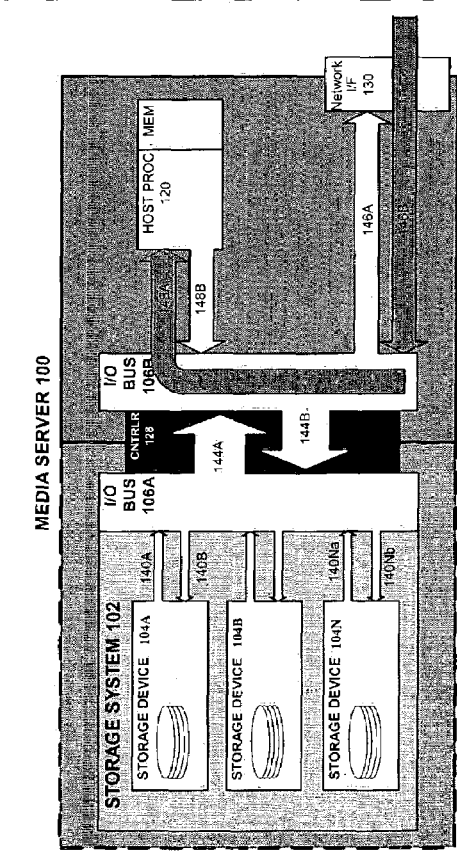
Figure 2D:
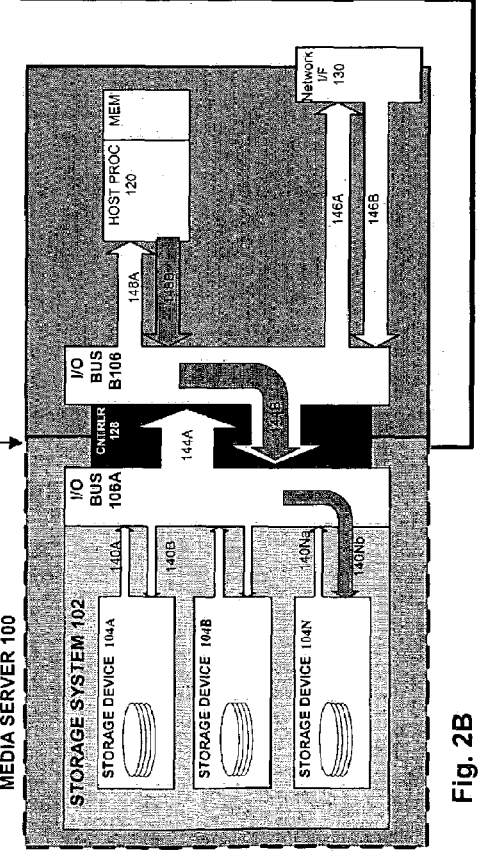

FIG. 6A illustrates a preferred embodiment of an adaptable cache 600. As shown in FIG. 6A, adaptable cache 600 preferably comprises a data interface 610, core logic 620, and storage medium 630.

Data interface 610 preferably comprises one or more physical interface connectors for connecting with one or more I/O buses, such as I/O buses 106A, B. Each connector is typically designed to connect only with a single type of I/O bus.

Core logic 620 preferably includes one or more physical components which, in the aggregate, comprise a single logical block of operation. These components preferably include:
1. bootstrapping instructions (to bring the adaptable cache from a "power off" state to an operational state);
2. an operational instruction set that defines adaptable cache functionality;
3. an interface to the storage medium; and
4. an interface to the data interface.

Storage medium 630 is adapted to store data such as digital media assets in a persistent manner. In a preferred embodiment, storage medium 630 comprises a plurality of volatile or non-volatile memory components such as DRAM or Flash memory boards that utilize an electronic storage medium. Alternatively or in addition, storage medium 630 may comprise magnetic media. In a preferred embodiment, where storage medium 630 comprises volatile components, a power supply or magnetic backing may be provided to allow data to persist as if the components were non-volatile.

Electronic media does not require mechanical movement to function. The absence of moving parts increases the stability of storage medium 530, decreasing the likelihood of a break down and increasing reliability. In addition, electronic media provide substantially improved data transfer capacity and improved performance since there is no mechanical seek and rotation time. As a result, electronic media are orders of magnitude faster than a conventional hard disk drive.

Aspects of core logic 620 are shown in more detail in FIG. 6B. As shown in FIG. 6B, core logic 620 preferably comprises a plurality of programmable logic devices, PLDs A-C. PLD's suitable for use in the present system and method include field-programmable gate arrays ("FPGA"), complex PLDs ("CPLDs"), or other chip structures utilizing permanent, programmable, or volatile memory. Alternatively, core logic 620 may comprise a plurality of CPUs, microcontrollers, or ASICs.

As further shown in FIG. 6B, PLD 622A preferably is programmed to comprise an I/O bus controller 624 for controlling communications between adaptable cache 600 and an I/O bus to which the adaptable cache connects. Alternatively, I/O bus controller 624 may be integrated with data interface 610. PLD 622B preferably comprises bootstrap instructions for taking the adaptable cache from a "power off" state to an operational state and control instructions 626 for control operation of the adaptable cache, as described in more detail below. PLD 622C is preferably programmed to provide interfaces between PLD 622A and PLD 622B, between PLD 622A and storage medium 630, and between PLD 622B and storage medium 630. Alternatively, core logic 620 may comprise one or more PLDs adapted to perform all of the functions described above.

Figure 7:
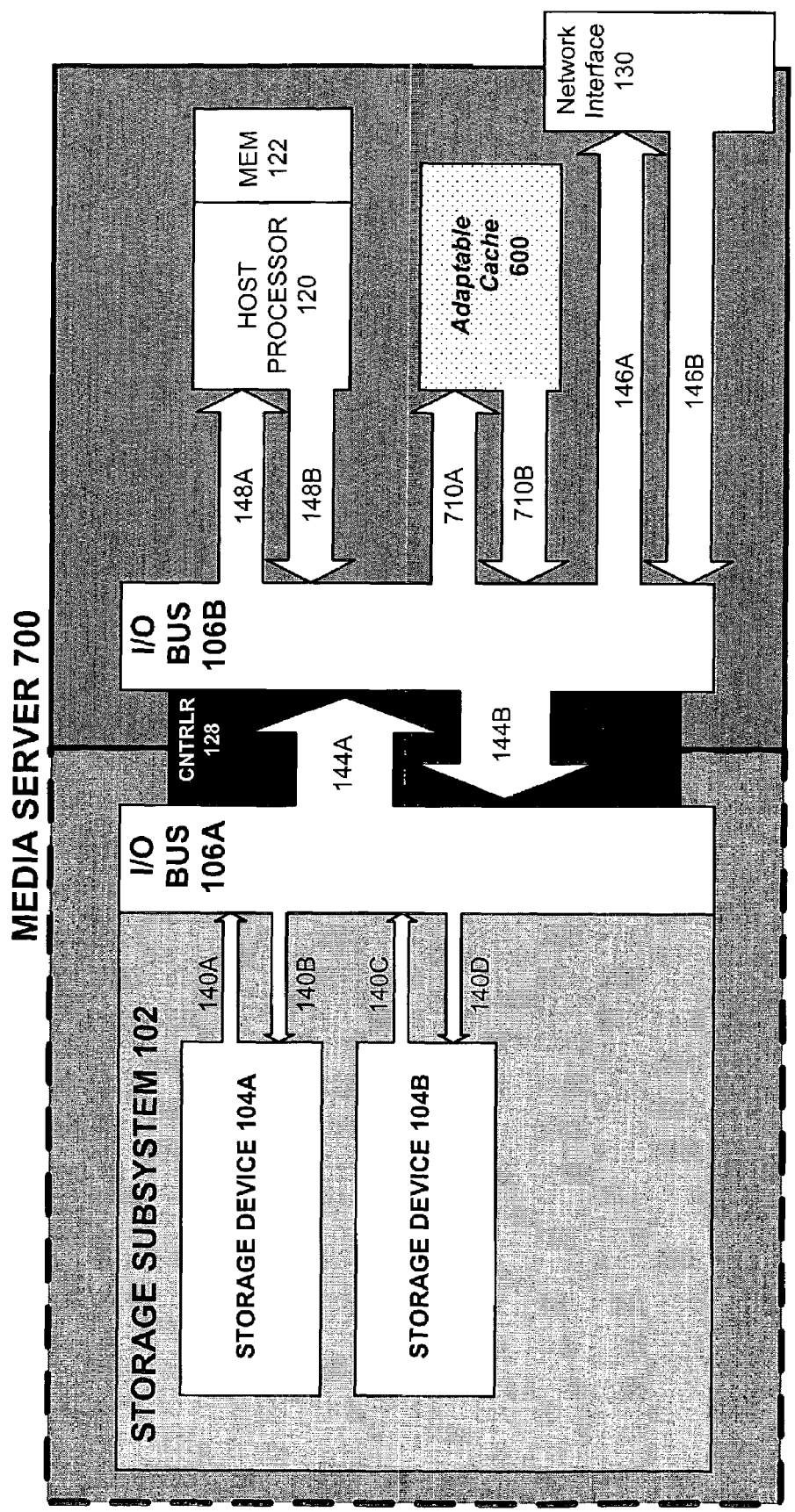
FIG. 7 is a block diagram illustrating a preferred embodiment of the present invention in which an adaptable cache is connected to a host-side bus.

One preferred embodiment of a media server 700 incorporating an adaptable cache is shown in FIG. 7. As will be recognized, many of the components in FIG. 7 correspond to those described above in connection with FIG. 1, and corresponding components in the two figures are identified by corresponding reference numerals.

As shown in FIG. 7, adaptable cache 600 is connected to host side I/O bus 106B via a high-speed interface connection 710. In this embodiment, the physical specifications of the adaptable cache preferably include the following:
- the form factor of a PCI card;
- storage capacity in excess of 1 gigabyte (GB) using replaceable commercially off-the-shelf memory modules (such as dual inline memory modules—DIMMs) or fixed memory circuits; and
- conformity to PCI hot-swap specifications to allow the adaptable cache to be removed from service while the host system is in operation. The storage size of the adaptable cache can therefore be altered through a hot-swap without disrupting the operation of the media server.

In this embodiment, the adaptable cache and any persisted data would reside on the same I/O bus as the network interface 130, I/O bus 106B in the embodiment of FIG. 7. Data requested by the user that persists on the adaptable cache is returned via I/O bus 106B, thus reducing bus traversals.

Figure 8:
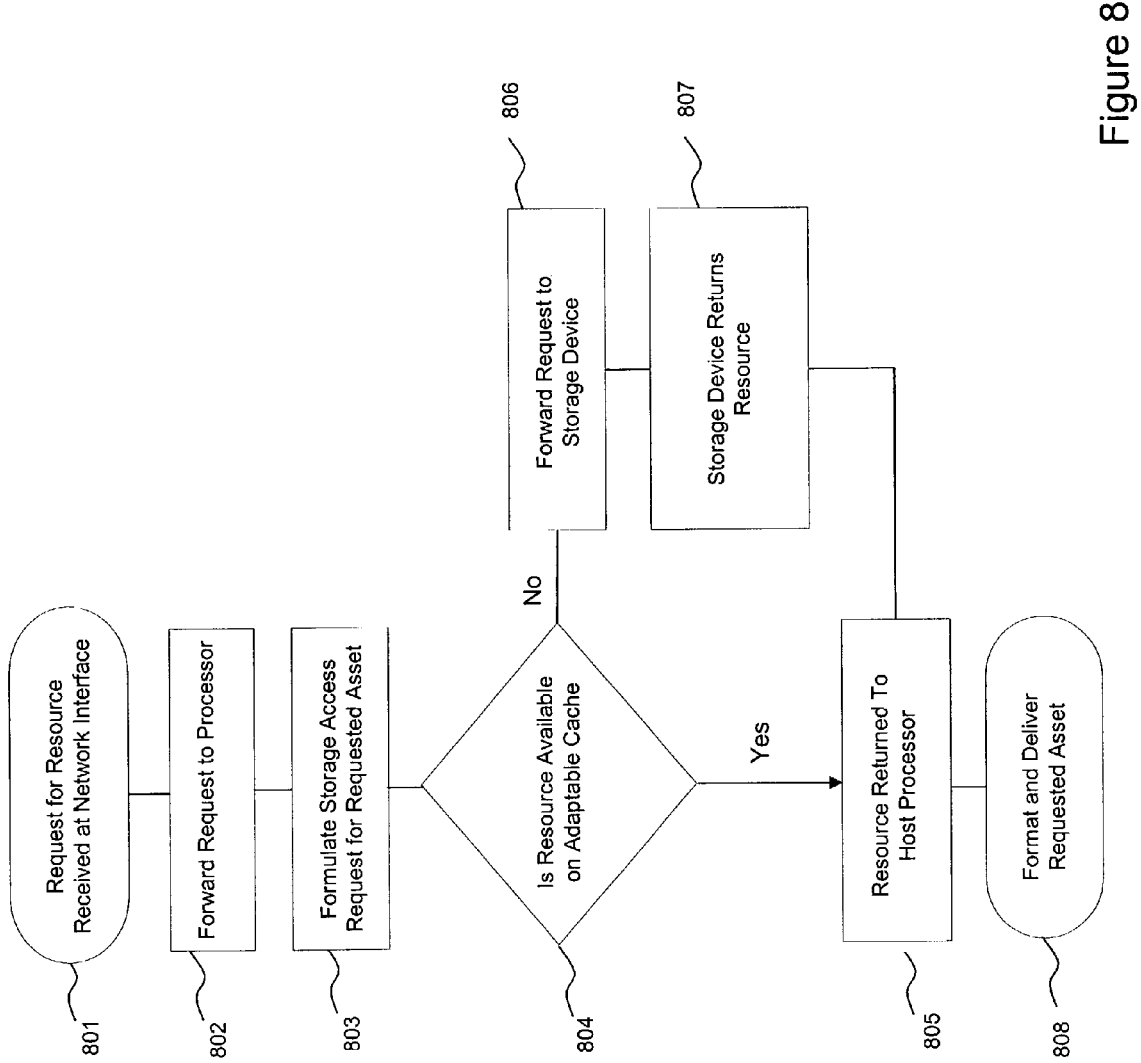
FIG. 8 is a flow diagram illustrating operation of the preferred embodiment of FIG. 7.

One preferred embodiment for operation of the system shown in FIG. 7 will now be described in connection with FIG. 8. In step 801, an asset request is received at network interface 130. As noted above, this request may originate with a client, a system administrator, or another application, such as an application running on a second digital media server belonging to the same load-balancing group as server 700.

In step 802, the request is forwarded to host processor 120. Host processor 120 formulates a storage access request for the requested asset and transmits the request to adaptable cache 600 (step 803).

In step 804, adaptable cache 600 determines if the requested asset persists on its storage medium. If the asset is available, the adaptable cache returns it to host processor 120 via I/O bus 106B (step 805).

Otherwise, in step 806, the adaptable cache forwards the asset request to storage subsystem 102 for regular processing, as described below. In step 807, storage subsystem 102 returns the requested asset to host processor 120. Once it receives the asset, host processor 120 converts it to an appropriate wire format for delivery to the customer via network interface 130 (step 808).

It should be noted that although, for ease of illustration, media server 700 is described as comprising a single network interface, media server 700 may be provided with separate network interfaces for receiving client requests and transmitting digital media as. taught in U.S. patent application Ser. No. 10/369,305, filed Feb. 19, 2003, entitled Hybrid Streaming Platform, which is hereby incorporated by reference in its entirety for each of its teachings and embodiments. Further, it should be noted that although, for purposes of illustration, single instances of host processor 120, controller 128, host I/O bus 106B, and storage system I/O bus 106A are described, alternate embodiments of the present system and method may comprise additional numbers of these components.

In a preferred embodiment, adaptable cache 600 is adapted to proactively cache resources, and is further adapted to notify potential calling applications and other processes of assets it maintains.

Alternatively or in addition, the adaptable cache may be adapted to direct the storage system not to respond to requests for particular assets when the assets are cached in the adaptable cache. Operation of one preferred embodiment for implementing proactive caching and notification is described in connection with FIG. 9.

Figure 9:
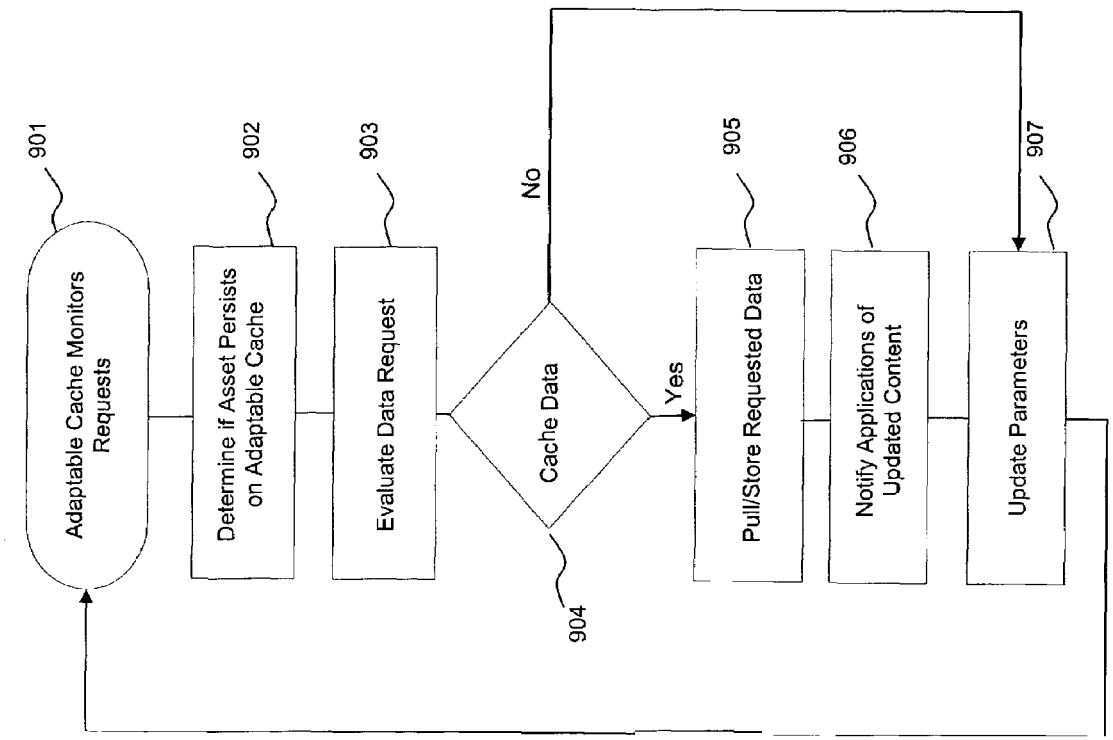
FIG. 9 is a flow diagram illustrating proactive caching in a preferred embodiment of the present invention.

As shown in FIG. 9, in step 901, adaptable cache 600 monitors I/O bus 106B for asset requests. These may represent requests for content to be delivered immediately or requests for content to be delivered at a specified later time.

When a request is detected, the adaptable cache determines whether a copy of some or all of the asset is stored in storage medium 630 (step 902). In step 903, adaptable cache 600 further evaluates the request in accordance with one or more caching rules programmed into core logic 620. In a preferred embodiment, these caching rules may take account of parameters maintained by core logic 620, such as available capacity in adaptable cache 600 and the request frequency for the requested asset.

On the basis of steps 902-903, adaptable cache 600 determines whether or not some or all of the requested asset or some related asset should be proactively cached (step 904). If it is determined that some or all of an asset should be proactively cached, the system proceeds to step 905 where the adaptable cache communicates directly with the appropriate storage system or device (e.g., storage system 102) and transfers all or a portion of the asset into its storage medium 630.

In step 906, the adaptable cache notifies requesting applications and other processes that may require the requested asset of its updated content so that future requests for that asset may be directed to the adaptable cache. These applications/processes, or associated hardware or software may preferably maintain a table that lists assets available from adaptable cache 600. Each entity receiving notification from adaptable cache 600 preferably updates its table appropriately to reflect the current content of adaptable cache 600. Processing then proceeds to step 907, described below.

If in step 904 it is determined not to cache requested content, the system proceeds directly to step 907 where parameters maintained by core logic 620 are updated. In a preferred embodiment, such parameters may, for example, include the number of times a particular asset has been requested within a specified amount of time and available capacity within the adaptable cache. Processing then returns to step 901 where adaptable cache 600 continues to monitor the I/O bus.

As will be recognized by those skilled in the art, passive monitoring of bus 106B by adaptable cache 600 as described above may be impractical with more modern busses which are often segmented and behave more like networks in which each device sees only traffic specifically addressed to it. Accordingly, in systems comprising such busses, network interface 130 may be adapted to address each received asset request to both host processor 120 and to adaptable cache 600 so that adaptable cache 600 may monitor traffic between network interface 130 and host processor 120. References to monitoring by the adaptable cache herein should be understood to include both passive monitoring as well as monitoring using such a dual addressing scheme.

Alternatively or in addition, adaptable cache 600 may be adapted to perform interval caching wherein a sorted list of pairs of overlapping requests for the same asset is maintained that identifies pairs of requests with the shortest intervals between their start times. For these pairs, as the first request in the pair is streamed, the streamed content is also cached and then read from cache to serve the second request.

Figure 10:
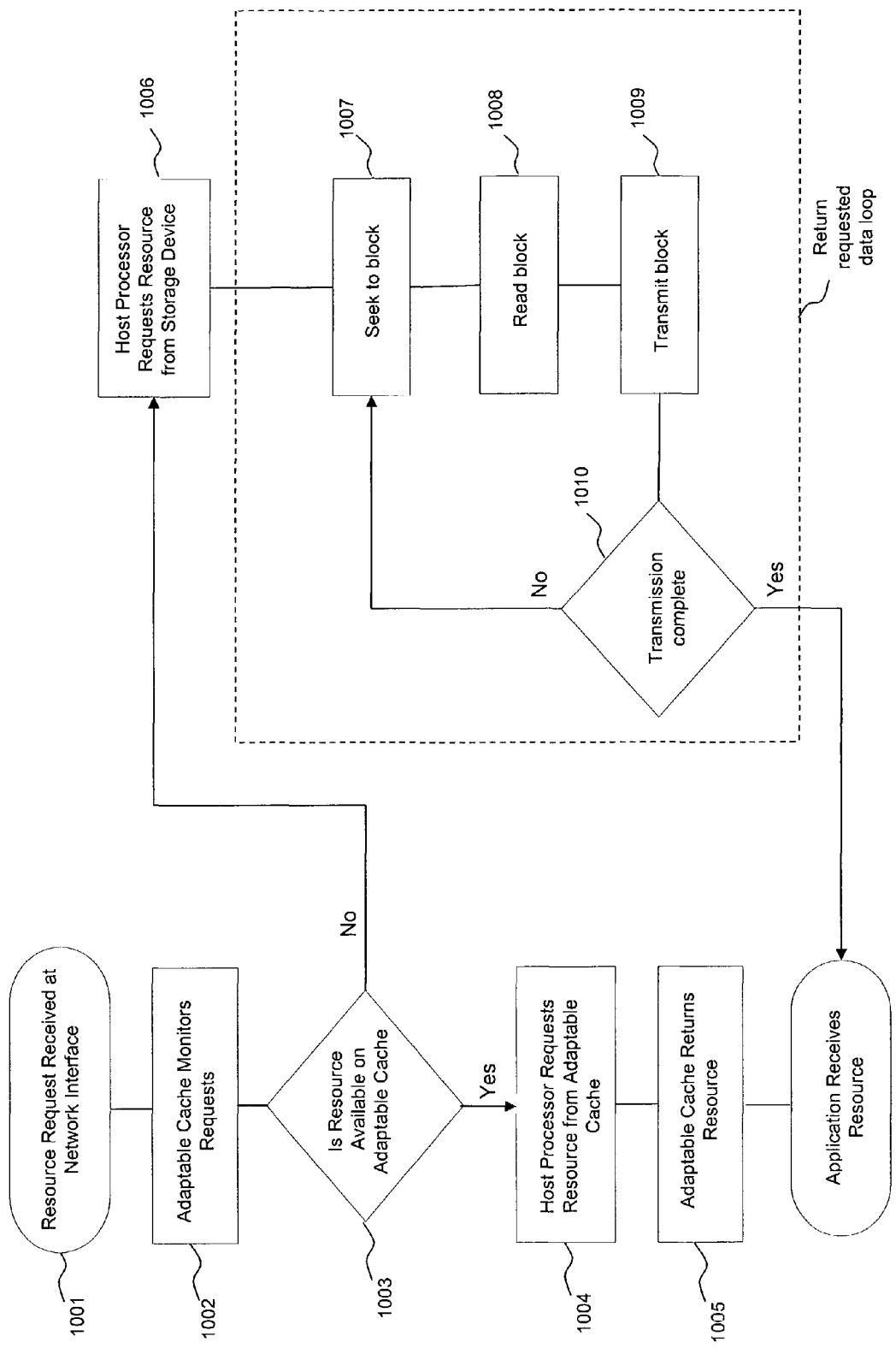
FIG. 10 is a flow diagram illustrating the use of data that has been proactively cached in a preferred embodiment of the present invention.

One preferred embodiment for operation of a media server 700 comprising an adaptable cache 600 adapted for proactive caching and notification will now be described in connection with FIG. 10. As shown in FIG. 10, in step 1001, a request for an asset is received via network interface 130 and forwarded to host processor 120 via I/O bus 106B. In step 1002, adaptable cache 600 monitors I/O bus 106B for such requests, caches appropriate content if warranted under its caching rules, and notifies any requesting applications (including the requesting application running on host processor 120) of its updated content, as described above in connection with FIG. 9.

In step 1003, host processor 120 determines whether or not the requested asset is available from adaptable cache 600, such as by consulting a table that stores current assets maintained by the adaptable cache. If the asset (or some portion of the asset) is available from adaptable cache 600, host processor 120 formulates a request for the asset (or portion thereof) to adaptable cache 600 (step 1004). In step 1005, adaptable cache 600 returns the requested asset to host processor 120.

Otherwise, if the asset is not available from adaptable cache 600, host processor 120 formulates a request for the asset to storage system 102 (step 1006). The requested asset is read in blocks from a storage device 104 of storage system 102 and transmitted to host processor 120, as shown by the iteration of steps 1007-1010. More particularly, for each block, the storage device finds the block on the hard drive (step 1007), reads the block (step 1008), transmits the block (step 1009), and determines whether or not the asset comprises additional blocks (step 1010).

Figure 11:
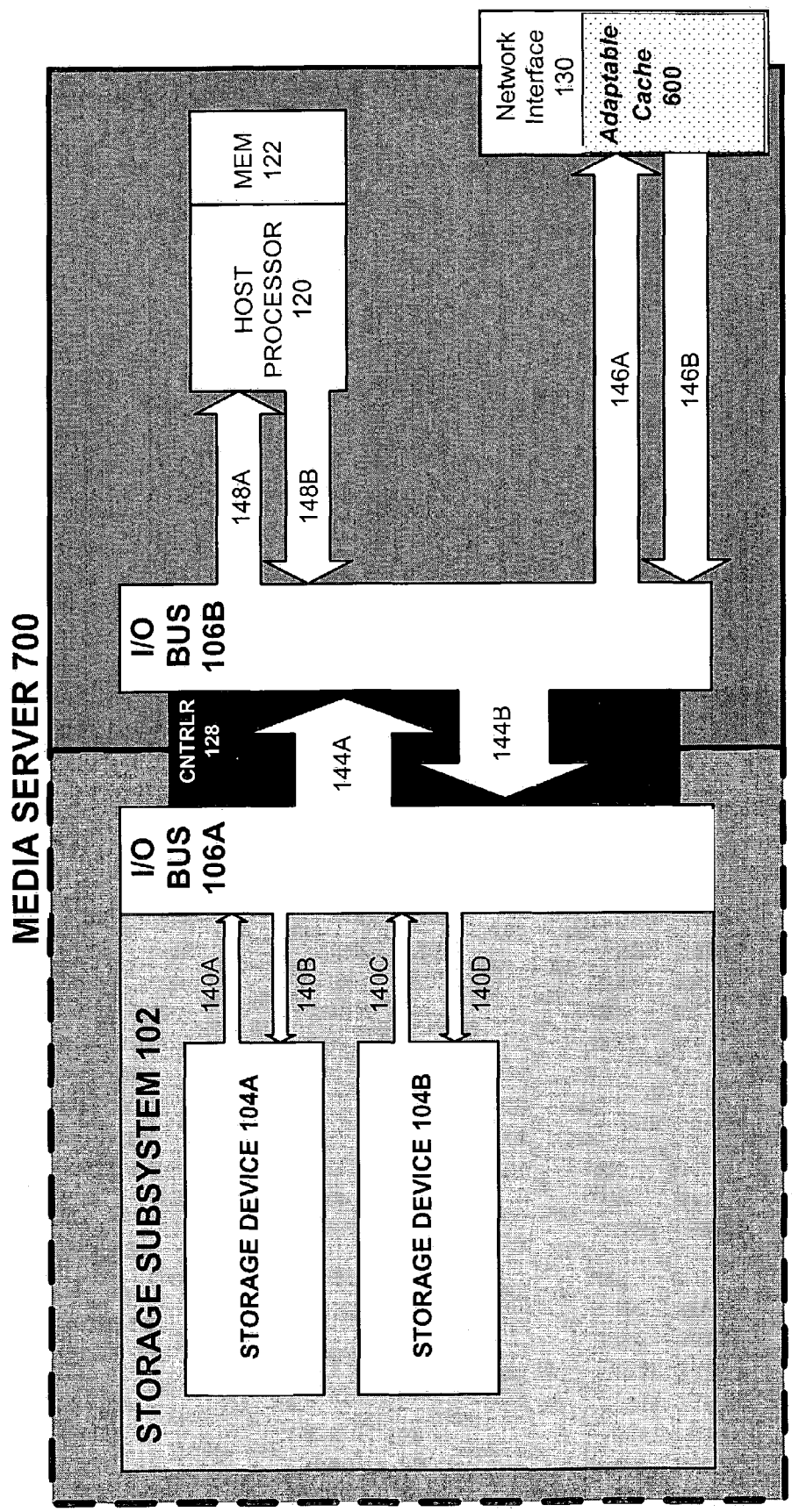
FIG. 11 is a block diagram illustrating a preferred embodiment of the present invention in which an adaptable cache is integrated with a network interface.

Another preferred embodiment for implementing the present system and method is shown in connection with FIG. 11. As in FIG. 10, adaptable cache 600 in FIG. 11 also resides as a device connected to the host side I/O bus 106B. In this embodiment, however, adaptable cache 600 is preferably integrated with network interface 130. The adaptable cache 600 preferably interconnects with host side F/O bus 106B via interface connection 146. Preferred physical specifications for the adaptable cache in this preferred embodiment comprise:

- the form factor of a network interface card (e.g., a peripheral component interconnect or PCI card) which may be plugged into an available expansion slot on the host system (e.g., a PCI slot);
- storage capacity in excess of 1 gigabyte (GB) using replaceable commercially off-the-shelf memory modules (such as dual inline memory modules—DIMMs) or fixed memory circuits; and
- conformity to PCI hot-swap specifications to allow the adaptable cache to be removed from service while the host system is in operation. As noted above, the storage size of the adaptable cache can therefore be altered through a hot-swap without disrupting the operation of the media server.

In this preferred embodiment, adaptable cache 600 is programmed to respond directly to asset requests when the requested asset is available in its storage medium 630. In this way, asset requests may be serviced and delivered from the network interface card, eliminating bus traversals when assets requested by the user reside in the adaptable cache.

Figure 12:
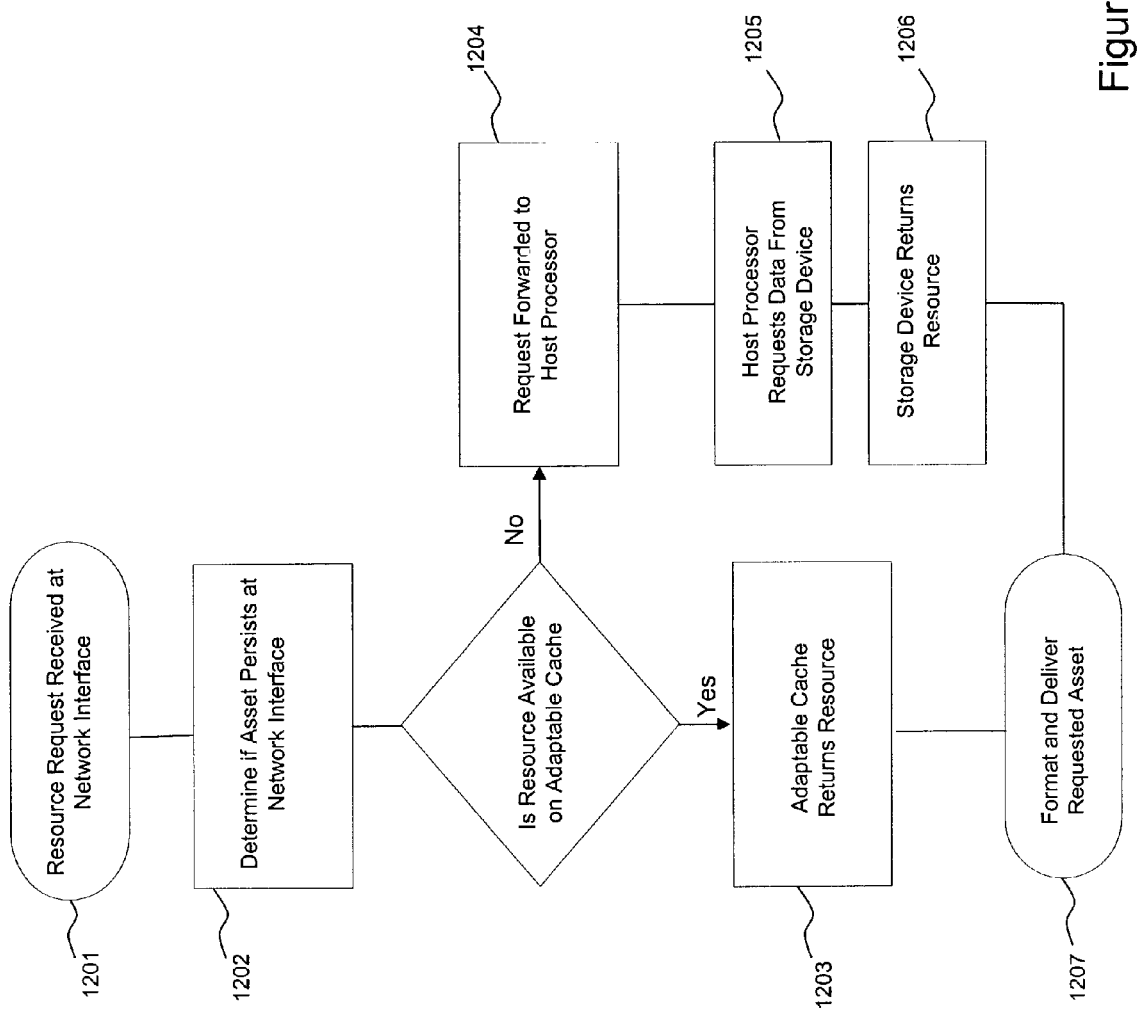
FIG. 12 is a flow diagram illustrating the operation of the preferred embodiment of FIG. 11.

Operation of the system shown in FIG. 11 will now be described in connection with FIG. 12. In step 1201, an asset request is received at network interface 130. In step 1202, adaptable cache 600 determines if the requested asset is available on the adaptable cache.

If the asset is available on the adaptable cache, the request is preferably serviced and delivered to the user from the same card, eliminating bus traversals on buses 106 (step 1203). More specifically, the adaptable cache retrieves the resource from storage medium 630, converts it to an appropriate wire format and delivers it to the requesting client.

Otherwise, in step 1204, if the requested resource is not available from the adaptable cache, the request is forwarded to host processor 120 for processing. In step 1205, host processor 120 formulates a request for the asset to storage system 102. In step 1206, the asset is returned to host processor 120, as described above in connection with FIG. 10. In step 1207, host processor 120 converts the asset to an appropriate wire format and delivers it to the client via network interface 130.

It should be recognized that the proactive caching and notification described above may also be implemented in this embodiment. Thus, adaptable cache 600 may be adapted to monitor received requests, proactively cache some or all of an asset in accordance with caching rules, and notify one or more applications or processes of content that it is currently storing. Further, the adaptable cache may be adapted to direct the storage system not to respond to requests for particular assets when the assets are cached in the adaptable cache.

Figure 13:
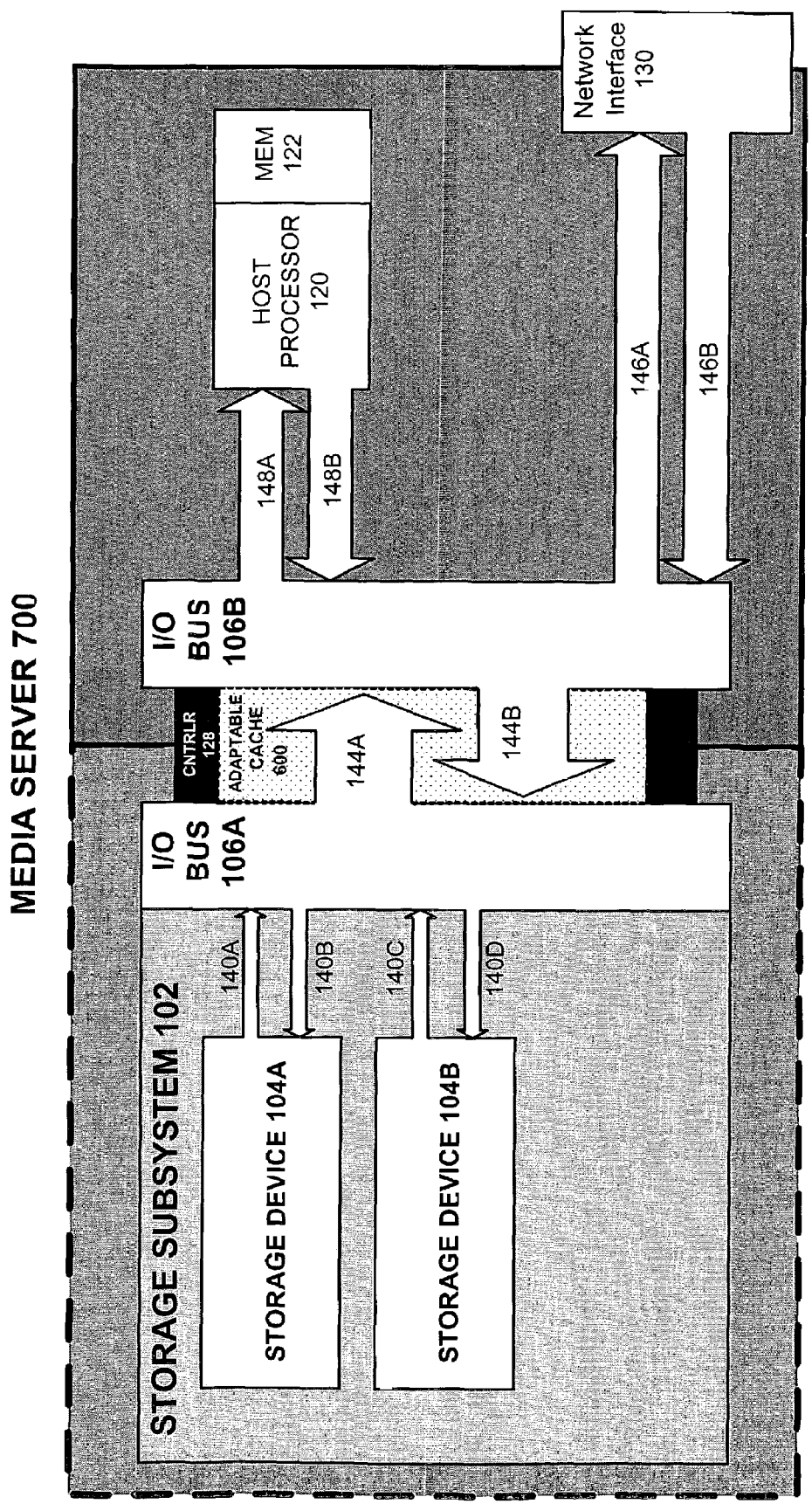
FIG. 13 is a block diagram illustrating a preferred embodiment of the present invention in which an adaptable cache is integrated with a host bus adapter.

Another preferred embodiment for implementing the present system and method is shown in FIG. 13. In the embodiment of FIG. 13, adaptable cache 600 is integrated with controller 128, bridging I/O buses 106A, B. In this embodiment, adaptable cache 600 preferably plugs into an expansion slot on the host system and provides multiple standard high-speed interfaces, such as bridging Fibre Channel and PCI I/O interfaces. In this embodiment, preferred physical specifications of the adaptable cache include:

- the form factor of a peripheral component interconnect (PCI) card;
- storage capacity in excess of 1 gigabyte (GB) using replaceable commercially off-the-shelf memory modules (such as dual inline memory modules—DIMMs) or fixed memory circuits; and
- conformity to PCI hot-swap specifications to allow the adaptable cache to be removed from service while the host system is in operation. As noted above, the storage size of the adaptable cache can therefore be altered through a hot-swap without disrupting the operation of the media server.

Figure 14:
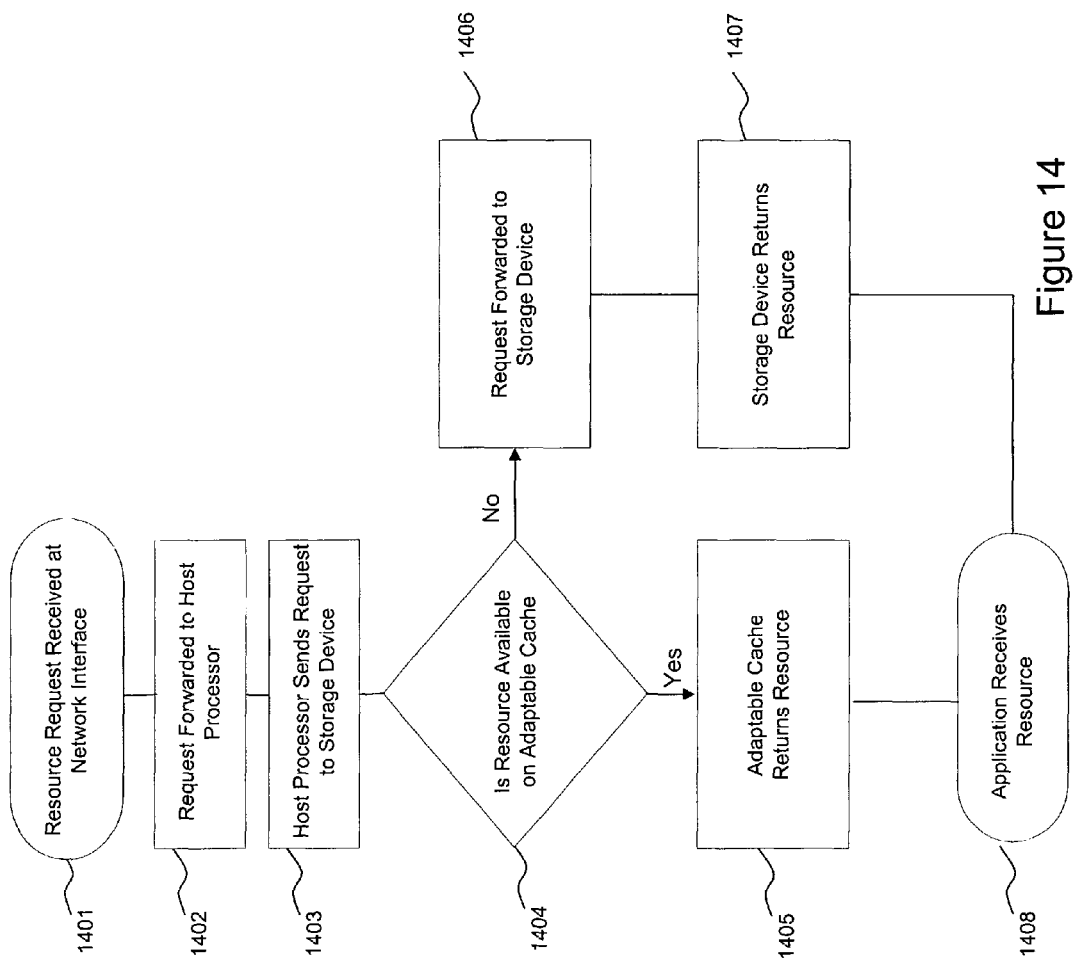
FIG. 14 is a flow diagram illustrating the operation of the preferred embodiment of FIG. 13.

Operation of the system shown in FIG. 13 will now be described in connection with FIG. 14. In step 1401, a user request is received at network interface 130. In step 1402, the request is forwarded to host processor 120 via I/O bus 106B. In step 1403, host processor 120 sends a request for the asset to storage system 102 via I/O bus 106B.

In step 1404, adaptable cache 600 (integrated with controller 128 in this embodiment) monitors asset requests that traverse I/O buses 106A, B and determines if the requested asset is available on the adaptable cache. In step 1405, if the asset is available on the adaptable cache, it is returned to host processor 120.

Otherwise, if the requested resource is unavailable from the adaptable cache, the request is forwarded to storage system I/O bus 106A for delivery to the appropriate storage device 104 where the resource persists (step 1406). In step 1407, the storage device returns the resource to the requesting application, as described in more detail above. In step 1408, host processor 120 receives the requested resource, as described in more detail above.

It should be recognized that the proactive caching and notification described above may also be implemented in this embodiment. Thus, adaptable cache 600 may be adapted to monitor received requests, proactively cache some or all of an asset in accordance with caching rules, and notify one or more applications or processes of content that it is currently storing. Further, the adaptable cache may be adapted to direct the storage system not to respond to requests for particular assets when the assets are cached in the adaptable cache.

Figure 15:
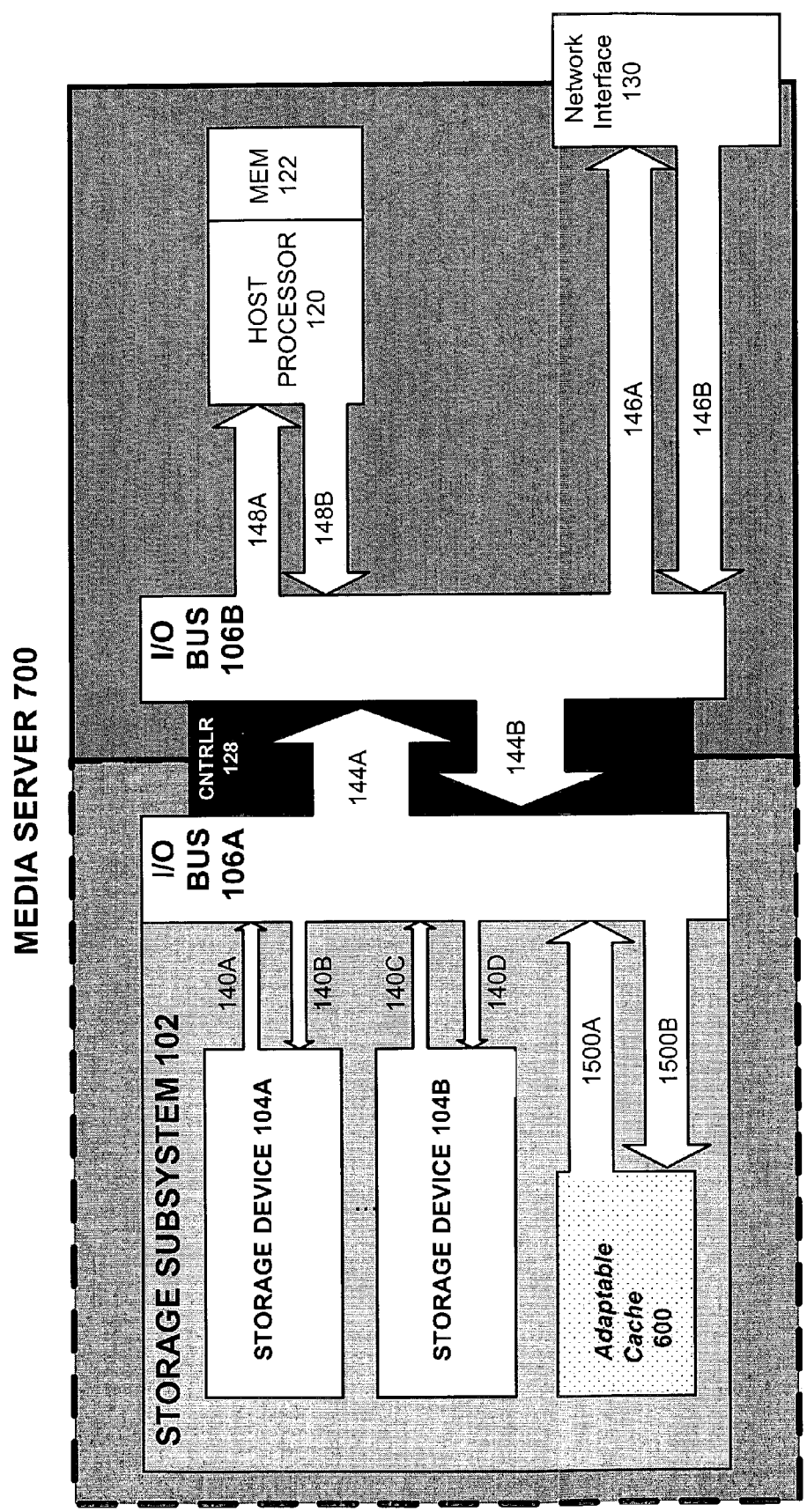
FIG. 15 is a block diagram illustrating a preferred embodiment of the present invention in which an adaptable cache is connected to a storage-system bus.

Yet another preferred embodiment for implementing the present system and method is shown in FIG. 15. In FIG. 15, an adaptable cache 600 resides on storage system 102. Adaptable cache 600 preferably interconnects with storage system I/O bus 106A via a high-speed interface connection 1500. This high-speed interface connection preferably allows adaptable cache 600 to replace or supplement existing hard drive storage devices on storage system 102 (including RAID arrays or JBODs) as long as the system has a compatible receptacle and I/O interface. In this embodiment, preferred physical specifications of the adaptable cache comprise:

- the form factor of a 3.5" hard disk drive with a 1" nominal height;
- dual fibre channel interface utilizing a standard SCA 40-pin connector and operating at transfer rates of either 1 or 2 gigabits per second (Gbps);
- storage capacity in excess of 1 gigabyte (GB) using replaceable commercially off-the-shelf memory modules (such as dual inline memory modules—DIMMs) or fixed memory circuits—this facilitates a lower cost while simultaneously providing the benefit of readily available and quality controlled components; and
- hot-swap capability (the ability to swap or remove the adaptable cache from service while the system is in operation). As noted above, the storage size of the adaptable cache can therefore be altered through a hot-swap without disrupting the operation of the media server.

Figure 16:
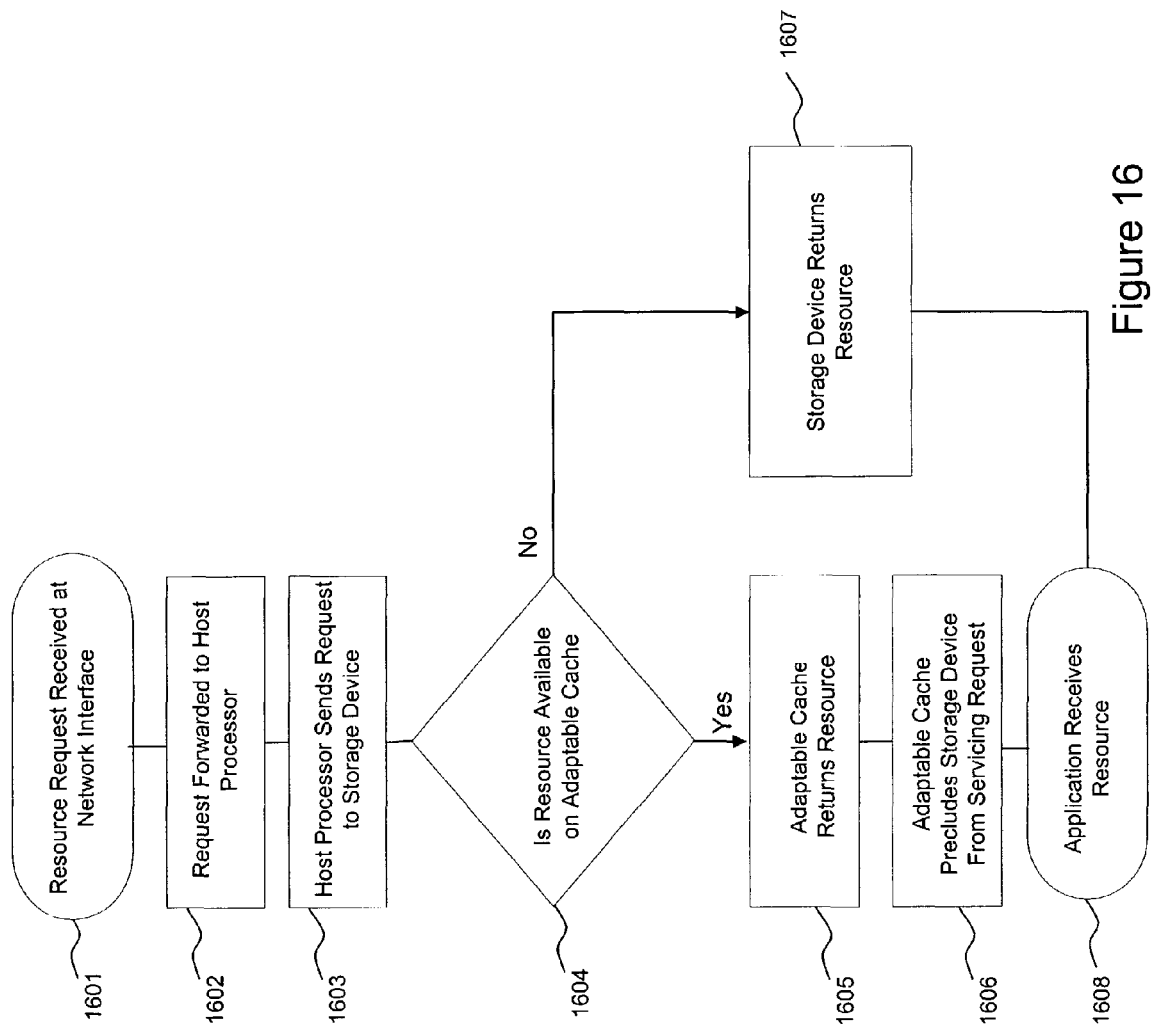
FIG. 16 is a flow diagram illustrating the operation of the preferred embodiment of FIG. 15.

Operation of the preferred embodiment shown in FIG. 15 will now be described in connection with FIG. 16. In step 1601, a user request is received at network interface 130. In step 1602, the request is forwarded to host processor 120 via I/O bus 106B. In step 1603, host processor 120 sends a request for the asset to storage system 102 via I/O bus 106B.

In step 1604, adaptable cache 600 monitors asset requests that traverse I/O bus 106A and determines if the requested asset is available on the adaptable cache. As noted above, those skilled in the art will recognize that passive monitoring of bus 106B by adaptable cache 600 may be impractical with more modem busses which are often segmented and behave more like networks in which each device sees only traffic specifically addressed to it. Accordingly, as noted above, in systems comprising such busses, host processor 120 may be adapted to address each received asset request to both storage device 104 and to adaptable cache 600 so that adaptable cache 600 may monitor traffic between host processor 120 and storage device 104.

In step 1605, if the asset is available on the adaptable cache, it is returned to host processor 120. In this case, the adaptable cache or other suitable component in storage system 102 may also preferably be adapted to preclude other storage devices 104 from responding to the request from host processor 120 since such storage device will be unable to retrieve and forward the asset to host processor 120 as efficiently as adaptable cache 600 (step 1606).

Otherwise, if the requested resource is unavailable from the adaptable cache, the request is delivered to the appropriate storage device 104 where the resource persists (step 1607). In step 1608, the storage device returns the resource to the requesting application, as described in more detail above.

It should be recognized that the proactive caching and notification described above may also be implemented in this embodiment. Thus, adaptable cache 600 may be adapted to monitor received requests transmitted via I/O bus 106A, proactively cache some or all of an asset in accordance with caching rules, and notify one or more applications or processes of content that it is currently storing. Alternatively, these caching and monitoring components may be divided. More specifically, a separate monitoring component may be provided on I/O bus 106A to monitor requests as they are received by network interface 130. When appropriate, the monitoring component may instruct adaptable cache 600 (residing, for example, on I/O bus 106A) to retrieve and store some or all of an asset.

It should also be noted that although, in the preferred embodiments described above, system components are linked via PCI buses such as bus 106A, B, these components may alternatively be linked via other bus types or data exchanges such as switched fabric and associated daughtercards.

While the invention has been described in connection with specific. embodiments, it is evident that numerous alternatives, modifications, and variations will be apparent to those skilled in the art in light of the foregoing description.

The invention claimed is:

1. A method for reducing bus traversal in a media server comprising a host processor, at least one network interface, and a storage subsystem comprising one or more storage devices, the host processor and the at least one network interface being connected to a first input-output bus, the storage subsystem being connected to a second input-output bus, the first and second input-output buses being connected via a controller, the method comprising:

receiving a request for a media asset via a network, said request being received by a network interface;

receiving the request at the an adaptable cache at least partially inside said media server, said adaptable cache hot-swappably connected to the first input-output bus, said adaptable cache comprising a data interface, core logic configured to dynamically alter its operating characteristics by modification of a caching rule to account for asset request frequency without disconnecting said adaptable cache from the media server, and electronic storage media;

processing the request by the adaptable cache, wherein if the requested media asset is found on the electronic storage media, the media asset is returned to the user via the first bus and wherein if the requested media asset is not found on the electronic storage media, the media asset is accessed from the storage subsystem and returned to the user via the second bus and first bus, wherein the adaptable cache:

monitors requests for media assets;

maintains a sorted list of pairs of overlapping requests for the same asset, said list identifying pairs of requests with the shortest intervals between their start times;

determines whether select media assets should be cached;

transfers said select media assets from said one or more storage devices to the electronic storage media; and, notifies at least one requesting application that the adaptable cache can accept future requests for said select media assets.

2. The method of claim 1, wherein the request is received at the adaptable cache via the host processor.

3. The method of claim 1, wherein if it is determined that the media should be cached, the adaptable cache notifies the storage subsystem to disregard requests to deliver the media.

4. The method of claim 1, wherein if the requested media asset is not found on the electronic storage media, the adaptable cache stores the requested media asset on the electronic storage media.

5. The method of claim 1, wherein the adaptable cache integrates into the media server via an expansion card slot.

6. The method of claim 1, wherein the adaptable cache integrates with native communications buses and protocols used in the media server.

7. The method of claim 1, wherein the adaptable cache utilizes the buses and protocols on used in the media server.

8. A method for improving transactional performance in a media server comprising a host processor, a at least one network interface, and a storage subsystem comprising one or more storage devices, the host processor and the at least one network interface being connected to a first input-output bus, the storage subsystem being connected to a second input-output bus, the first and second input-output buses being connected via a controller, the method comprising:

receiving a request for a media asset at a network interface;

receiving the request at an adaptable cache at least partially inside said media server, said adaptable cache hot-swappably connected to the second input-output bus, said adaptable cache comprising a data interface, a core logic, and electronic storage media, and configured to:

dynamically alter its operating characteristics by modification of a caching rule to account for asset request frequency without disconnecting said adaptable cache from the media server;

determine whether to retrieve and store data from the storage subsystem based on the algorithms and/or heuristics;

alter the storage size of the electronic storage media without disrupting the operation of the media server; and retrieve data from the storage subsystem using its own data interface;

processing the request by the adaptable cache, wherein if the requested media asset is found on the electronic storage media, the media asset is returned to the user without accessing the one or more storage devices on the storage subsystem, and wherein if the requested media asset is not found on the electronic storage media, the media asset is accessed from one or more storage devices on the storage subsystem and returned to the user, wherein the adaptable cache:

monitors requests for media assets;

maintains a sorted list of pairs of overlapping requests for the same asset, said list identifying pairs of requests with the shortest intervals between their start times;

determines whether select media assets should be cached;

transfers said select media assets from said one or more storage devices to the electronic storage media; and, notifies, at least one requesting application that the adaptable cache can accept future requests for said select media assets.

9. The method of claim 8, wherein the request is received at the adaptable cache via the second input-output bus.

10. The method of claim 8, wherein the adaptable cache integrates into the media server via an expansion card slot.

11. The method of claim 8, wherein if the requested media asset is not found on the electronic storage media, the adaptable cache stores the requested media asset on the electronic storage media.

12. The method of claim 8, wherein if it is determined that the media should be cached, the adaptable cache notifies the storage subsystem to disregard requests to deliver the media.

13. The method of claim 8, wherein the adaptable cache integrates with native communications buses and protocols used in the media server.

14. The method of claim 8, wherein the adaptable cache utilizes the buses and protocols used in the media server.

15. A system for facilitating delivery of media resources, comprising:

a media server comprising a host processor, at least one network interface, and a storage subsystem comprising one or more storage devices, the host processor and the at least one network interface being connected to a first input-output bus, the storage subsystem being connected to a second input-output bus, the first and second input-output buses being connected via a controller;

an adaptable cache at least partially inside said media server, said adaptable cache hot-swappably connected to an input-output bus of the media server, and comprising a data interface, core logic configured to dynamically alter its operating characteristics by modification of a caching rule to account for asset request frequency without disconnecting said adaptable cache from the media server, and electronic storage media, the adaptable cache being adapted to store data on the electronic storage media, and further being adapted to receive and process requests for media assets, wherein if the requested media asset is found on the electronic storage media, the media asset is returned via one or more I/O buses, and wherein if the requested media asset is not found on the electronic storage media, the media asset is accessed from the storage subsystem and returned, and wherein said adaptable cache is further adapted to monitor requests for media assets, to maintain a sorted list of pairs of overlapping requests for the same asset, said list identifying pairs of requests with the shortest intervals between their start times, to determine, based at least in part on said cache operating characteristics, whether select media assets should be cached, to transfer said select media assets from one or more storage devices to the electronic storage media, and to notify at least a requesting application that the adaptable cache can accept future requests for said select media assets.

16. A method for simulating passive monitoring of a bus by an adaptable cache means hot-swappably connected to said bus and positioned at least partially inside a media server, comprising:

identifying a first component that transmits messages to a second component, said messages desired to be monitored by an adaptable cache means comprising a data interface, a core logic configured to dynamically alter its operating characteristics by modification of a caching rule to account for asset request frequency without disconnecting said adaptable cache from the media server, and electronic storage media;

adapting the first component to address the message to both the second component and the adaptable cache means, wherein the adaptable cache means:

monitors requests for media assets;

maintains a sorted list of pairs of overlapping requests for the same asset, said list identifying pairs of requests with the shortest intervals between their start times;

determines whether select media assets should be cached;

transfers said select media assets from one or more storage devices to the electronic storage media; and, notifies at least one requesting application that the adaptable cache can accept future requests for said select media assets.

17. The method of claim 1, wherein the adaptable cache integrates with a network interface.

18. The method of claim 1, wherein the adaptable cache integrates with said controller.

19. The system of claim 15, wherein the adaptable cache is hot-swappably connected to said first input-output bus.

20. The system of claim 19, wherein the adaptable cache integrates with a network interface.

21. The system of claim 19, wherein the adaptable cache integrates with said controller.

22. The system of claim 15, wherein the adaptable cache is hot-swappably connected to said second input-output bus.

23. A media server means for delivering requested media assets to requesting clients, comprising:

at least one network interface means for receiving media asset requests on behalf of said media server, said media asset requests being delivered via a network, and for returning requested media assets to a requesting client via said network;

a storage subsystem means for storing a plurality of media assets;

a host processor means for processing said requests for media assets, said host processor means coupled to said network interface means via a first Input/Output (I/O) bus, wherein said host processor means is configured to retrieve requested media assets from said storage subsystem means and deliver said requested media assets to said network interface means;

a controller means for connecting said first I/O bus to a second I/O bus, said second I/O bus being coupled to said storage subsystem means; and an adaptable cache means for detecting media asset requests, and for proactively caching media assets and notifying potential calling applications of media assets stored in said adaptable cache, wherein the adaptable cache means;

monitors requests for media assets;

maintains a sorted list of pairs of overlapping requests for the same asset, said list identifying pairs of requests with the shortest intervals between their start times;

determines whether select media assets should be cached;

transfers said select media assets from said one or more storage devices to the electronic storage media; and, notifies, at least one requesting application that the adaptable cache can accept future requests for said select media assets.

24. The media server means of claim 23, wherein said adaptable cache means is coupled to said first I/O bus.

25. The media server means of claim 24, wherein said adaptable cache means is integrated with said network interface means.

26. The media server means of claim 24, wherein the adaptable cache means is integrated with said controller means.

27. The media server means of claim 24, wherein the adaptable cache means is coupled to said second I/O bus.

28. The media server means of claim 23, said adaptable cache means comprising means for directing said storage subsystem means not to respond to a request for an asset when said asset is present in the adaptable cache means.

29. The media server means of claim 23, said adaptable cache means comprising means for maintaining parameters comprising a number of times a particular asset has been requested within a specified amount of time and available capacity within said adaptable cache means.

* * * * *